United States Patent
Fanton

(10) Patent No.: US 12,291,371 B2
(45) Date of Patent: May 6, 2025

(54) METHOD FOR FORMING A CURL AND A THREADED METALLIC CONTAINER INCLUDING THE SAME

(71) Applicant: Ball Corporation, Westminster, CO (US)

(72) Inventor: Cedric Fanton, Lyons (FR)

(73) Assignee: BALL CORPORATION, Westminster, CO (US)

( * ) Notice: Subject to any disclaimer, the term of this patent is extended or adjusted under 35 U.S.C. 154(b) by 36 days.

(21) Appl. No.: 18/164,361

(22) Filed: Feb. 3, 2023

(65) Prior Publication Data

US 2023/0249865 A1    Aug. 10, 2023

Related U.S. Application Data

(60) Provisional application No. 63/306,755, filed on Feb. 4, 2022.

(51) Int. Cl.
*B65D 1/02*    (2006.01)
*B65D 83/38*   (2006.01)

(52) U.S. Cl.
CPC ......... *B65D 1/0246* (2013.01); *B65D 1/0207* (2013.01); *B65D 83/38* (2013.01); *B65D 2401/00* (2020.05)

(58) Field of Classification Search
CPC .................................................. B65D 1/0246
See application file for complete search history.

(56) References Cited

U.S. PATENT DOCUMENTS 3,029,507 A    4/1962  Gaggini
3,232,260 A    2/1966  Siemonsen
(Continued)

FOREIGN PATENT DOCUMENTS

CA    1252649    4/1989
CA    2133312    7/1994
(Continued)

OTHER PUBLICATIONS

"Aerobal "World Aluminum Aerosol Can Award 2010" Stylish can design and "greener" production technology," Unipak, Sep. 27, 2010, 1 page.
(Continued)

*Primary Examiner* — Don M Anderson
(74) *Attorney, Agent, or Firm* — Sheridan Ross P.C.

(57) ABSTRACT

A metallic container includes a body with a bottom and a neck. The neck includes a thread profile, a curl, and a curl transition between the thread profile and the curl. The curl defines an opening. The thread profile of the neck is configured to receive a corresponding thread profile of a reusable closure when the reusable closure is coupled to the neck. The curl is configured to engage with an insert positioned proximate to the curl and within a cavity defined in a casing of the reusable closure. The curl is configured to reduce damage to the insert during at least one of the reusable closure being coupled to or uncoupled from the neck. Methods for fabricating the curl include applying a thread profile to a metallic container neck, reducing a diameter of a portion of the neck above the thread profile, and curling the reduced-diameter neck portion.

19 Claims, 14 Drawing Sheets

(56) References Cited

U.S. PATENT DOCUMENTS

| | | | |
|---|---|---|---|
| 3,650,473 A * | 3/1972 | Malone | B05B 11/0032 |
| | | | 222/541.2 |
| 3,812,646 A | 5/1974 | Baldyga et al. | |
| 4,243,438 A | 1/1981 | Yanagida et al. | |
| 4,260,419 A | 4/1981 | Robertson | |
| 4,269,632 A | 5/1981 | Robertson et al. | |
| 4,282,044 A | 8/1981 | Robertson et al. | |
| 4,318,755 A | 3/1982 | Jeffrey et al. | |
| 4,403,493 A | 9/1983 | Atkinson | |
| 4,411,707 A | 10/1983 | Brennecke et al. | |
| 4,693,108 A | 9/1987 | Traczyk et al. | |
| 4,732,027 A | 3/1988 | Traczyk et al. | |
| 5,102,705 A | 4/1992 | Yammoto et al. | |
| 5,104,465 A | 4/1992 | McAuliffe et al. | |
| 5,110,545 A | 5/1992 | McAuliffe et al. | |
| 5,138,858 A | 8/1992 | Johnson et al. | |
| 5,293,765 A | 3/1994 | Nussbaum-Pogacnik | |
| 5,355,710 A | 10/1994 | Diekhoff | |
| 5,362,341 A | 11/1994 | Palmer et al. | |
| 5,394,727 A | 3/1995 | Diekhoff et al. | |
| 5,448,903 A | 9/1995 | Johnson | |
| 5,469,729 A | 11/1995 | Hager | |
| 5,486,243 A | 1/1996 | Hashiguchi et al. | |
| 5,487,295 A | 1/1996 | Diekhoff et al. | |
| 5,503,690 A | 4/1996 | Wade et al. | |
| 5,522,248 A | 6/1996 | Diekhoff et al. | |
| 5,522,950 A | 6/1996 | Bartges et al. | |
| 5,544,770 A * | 8/1996 | Travisano | B65D 55/026 |
| | | | 215/349 |
| 5,551,997 A | 9/1996 | Marder et al. | |
| 5,571,347 A | 11/1996 | Bergsma | |
| 5,572,893 A | 11/1996 | Goda et al. | |
| 5,704,240 A | 1/1998 | Jordan | |
| 5,713,235 A | 2/1998 | Diekhoff | |
| 5,718,352 A | 2/1998 | Diekhoff et al. | |
| 5,769,331 A | 6/1998 | Yamagishi et al. | |
| 5,772,802 A | 6/1998 | Sun et al. | |
| 5,778,723 A | 7/1998 | Diekhoff | |
| 5,822,843 A | 10/1998 | Diekhoff et al. | |
| 6,010,026 A | 1/2000 | Diekhoff et al. | |
| 6,010,028 A | 1/2000 | Jordan et al. | |
| 6,100,028 A | 8/2000 | Cole et al. | |
| 6,126,034 A | 10/2000 | Borden et al. | |
| 6,171,362 B1 | 1/2001 | Osumi et al. | |
| 6,355,090 B1 | 3/2002 | Ohyama et al. | |
| 6,368,427 B1 | 4/2002 | Sigworth | |
| 6,543,636 B1 | 4/2003 | Flecheux et al. | |
| 6,607,615 B1 | 8/2003 | Bekki et al. | |
| 6,627,012 B1 | 9/2003 | Tack et al. | |
| 6,630,037 B1 | 10/2003 | Sawada et al. | |
| 6,666,933 B2 | 12/2003 | Roberts et al. | |
| 6,676,775 B2 | 1/2004 | Barth et al. | |
| 6,945,085 B1 | 9/2005 | Goda | |
| 6,959,830 B1 | 11/2005 | Kanou et al. | |
| 7,117,704 B2 | 10/2006 | Ogura et al. | |
| 7,140,223 B2 | 11/2006 | Chupak | |
| 7,147,123 B2 | 12/2006 | Yamashita | |
| 7,171,840 B2 | 2/2007 | Kanou et al. | |
| 7,294,213 B2 | 11/2007 | Warner et al. | |
| 7,520,044 B2 | 4/2009 | Bulliard et al. | |
| 7,555,927 B2 | 7/2009 | Hanafusa et al. | |
| 7,588,808 B2 | 9/2009 | Hutchinson et al. | |
| 7,666,267 B2 | 2/2010 | Benedictus et al. | |
| 7,713,363 B2 | 5/2010 | Sano et al. | |
| 7,798,357 B2 | 9/2010 | Hanafusa et al. | |
| 7,824,750 B2 | 11/2010 | Takegoshi et al. | |
| 7,942,028 B2 | 5/2011 | Gillest et al. | |
| 8,037,728 B2 | 10/2011 | Hosoi | |
| 8,037,734 B2 | 10/2011 | Hanafusa et al. | |
| 8,091,402 B2 | 1/2012 | Hanafusa et al. | |
| 8,132,439 B2 | 3/2012 | Hanafusa et al. | |
| 8,132,687 B2 | 3/2012 | Fedusa et al. | |
| 8,313,003 B2 | 11/2012 | Riley et al. | |
| 8,349,419 B2 | 1/2013 | Nishida et al. | |
| 9,227,748 B2 | 1/2016 | Nakagawa et al. | |
| 9,327,899 B2 | 5/2016 | Greenfield et al. | |
| 9,517,498 B2 | 12/2016 | Siles et al. | |
| 9,663,846 B2 | 5/2017 | Siles et al. | |
| 9,844,805 B2 | 12/2017 | Siles et al. | |
| 10,384,838 B2 | 8/2019 | Olson et al. | |
| 10,518,940 B2 * | 12/2019 | Vanon | B65D 41/348 |
| 10,584,402 B2 | 3/2020 | Siles et al. | |
| 11,519,057 B2 | 12/2022 | Siles et al. | |
| 2001/0003292 A1 | 6/2001 | Sun et al. | |
| 2001/0031376 A1 | 10/2001 | Fulton et al. | |
| 2002/0000788 A1 | 1/2002 | Ostergaard et al. | |
| 2002/0007881 A1 | 1/2002 | Daaland et al. | |
| 2004/0025981 A1 | 2/2004 | Tack et al. | |
| 2004/0035871 A1 | 2/2004 | Chupak | |
| 2004/0140237 A1 | 7/2004 | Brownewell | |
| 2004/0173560 A1 | 9/2004 | Chupak | |
| 2004/0213695 A1 | 10/2004 | Ferreira et al. | |
| 2004/0232176 A1 * | 11/2004 | Flecheux | B65D 1/0246 |
| | | | 222/570 |
| 2005/0067365 A1 | 3/2005 | Hanafusa et al. | |
| 2005/0127077 A1 | 6/2005 | Chupak | |
| 2006/0021415 A1 | 2/2006 | Bulliard et al. | |
| 2007/0062952 A1 | 3/2007 | Kobayashi et al. | |
| 2007/0295051 A1 | 12/2007 | Myers et al. | |
| 2008/0011702 A1 * | 1/2008 | Walsh | B65D 1/0207 |
| | | | 215/44 |
| 2008/0022746 A1 | 1/2008 | Myers et al. | |
| 2008/0041501 A1 | 2/2008 | Platek et al. | |
| 2008/0163663 A1 | 7/2008 | Hankey et al. | |
| 2008/0181812 A1 | 7/2008 | Ferreira et al. | |
| 2008/0299001 A1 | 12/2008 | Langlais et al. | |
| 2009/0220714 A1 | 9/2009 | Nishida et al. | |
| 2009/0277862 A1 | 11/2009 | Masuda et al. | |
| 2010/0065528 A1 | 3/2010 | Hanafusa et al. | |
| 2010/0199741 A1 | 8/2010 | Myers et al. | |
| 2010/0326946 A1 | 12/2010 | Hanafusa et al. | |
| 2011/0113732 A1 | 5/2011 | Adams et al. | |
| 2012/0024813 A1 | 2/2012 | Nakagawa et al. | |
| 2012/0031913 A1 * | 2/2012 | Moore | B65D 41/0457 |
| | | | 220/610 |
| 2012/0269602 A1 | 10/2012 | Hanafusa et al. | |
| 2013/0202477 A1 | 8/2013 | Zajac et al. | |
| 2017/0107020 A1 * | 4/2017 | Vanon | B67B 3/18 |
| 2018/0044155 A1 | 2/2018 | Ross et al. | |
| 2018/0078982 A1 | 3/2018 | Siles et al. | |
| 2020/0199715 A1 | 6/2020 | Siles et al. | |
| 2021/0205868 A1 | 7/2021 | Siles et al. | |
| 2021/0276069 A1 | 9/2021 | Johnson et al. | |

FOREIGN PATENT DOCUMENTS

| | | |
|---|---|---|
| CA | 2169743 | 2/1995 |
| CA | 2206483 | 9/1999 |
| CA | 2302557 | 9/2001 |
| CA | 2655925 | 1/2008 |
| CA | 2662199 | 3/2008 |
| CA | 2638403 | 10/2009 |
| CN | 1044925 | 8/1990 |
| CN | 1256671 | 6/2000 |
| CN | 1617821 | 5/2005 |
| CN | 1994826 | 7/2007 |
| CN | 101294255 | 10/2008 |
| CN | 100515875 | 7/2009 |
| CN | 101888907 | 11/2010 |
| CN | 101985707 | 3/2011 |
| DE | 60206036 | 6/2006 |
| EP | 0721384 | 7/1996 |
| EP | 1136154 | 9/2001 |
| EP | 1531952 | 8/2006 |
| EP | 1731239 | 12/2006 |
| EP | 2119515 | 11/2009 |
| EP | 2146907 | 1/2010 |
| EP | 2531409 | 12/2012 |
| EP | 2646328 | 10/2013 |
| EP | 2955131 | 12/2015 |
| EP | 3141624 | 3/2017 |
| FR | 2457328 | 12/1980 |
| GB | 971258 | 9/1964 |
| GB | 1215648 | 12/1970 |

(56) References Cited

FOREIGN PATENT DOCUMENTS

| | | |
|---|---|---|
| GB | 1598428 | 9/1981 |
| JP | S61-163233 | 7/1986 |
| JP | S62-263954 | 11/1987 |
| JP | H04-99142 | 3/1992 |
| JP | H06-279888 | 10/1994 |
| JP | H10-203573 | 8/1998 |
| JP | H11-293363 | 10/1999 |
| JP | 2000-063973 | 2/2000 |
| JP | 2001-115226 | 4/2001 |
| JP | 2001-172728 | 6/2001 |
| JP | 2001-181768 | 7/2001 |
| JP | 2001-213416 | 8/2001 |
| JP | 2001-315745 | 11/2001 |
| JP | 2002-173717 | 6/2002 |
| JP | 3408213 | 5/2003 |
| JP | 2003-205924 | 7/2003 |
| JP | 2003-268460 | 9/2003 |
| JP | 2003-334631 | 11/2003 |
| JP | 2004-035036 | 2/2004 |
| JP | 2004-083128 | 3/2004 |
| JP | 2005-096843 | 4/2005 |
| JP | 2005-511418 | 4/2005 |
| JP | 2005-193272 | 7/2005 |
| JP | 2005-280768 | 10/2005 |
| JP | 2006-62755 | 3/2006 |
| JP | 2006-62756 | 3/2006 |
| JP | 3754076 | 3/2006 |
| JP | 3886329 | 2/2007 |
| JP | 2007-106621 | 4/2007 |
| JP | 2007-153363 | 6/2007 |
| JP | 4159956 | 10/2008 |
| JP | 4173388 | 10/2008 |
| JP | 2009108421 | 5/2009 |
| JP | 2010-202908 | 9/2010 |
| JP | 4564328 | 10/2010 |
| JP | 2011-116456 | 6/2011 |
| JP | 4757022 | 8/2011 |
| JP | 2011-208273 | 10/2011 |
| JP | 2011-526232 | 10/2011 |
| JP | 2012-192984 | 10/2012 |
| JP | 5290569 | 9/2013 |
| JP | 5323757 | 10/2013 |
| JP | 5597333 | 10/2014 |
| JP | 5855233 | 2/2016 |
| JP | 5887340 | 3/2016 |
| RU | 2221891 | 1/2004 |
| UA | 44247 | 2/2002 |
| UA | 29644 | 2/2007 |
| UA | 28415 | 12/2007 |
| WO | WO 92/04477 | 3/1992 |
| WO | WO 93/17864 | 9/1993 |
| WO | WO 96/15865 | 5/1996 |
| WO | WO 96/28582 | 9/1996 |
| WO | WO 97/38146 | 10/1997 |
| WO | WO 97/46726 | 12/1997 |
| WO | WO 98/46488 | 10/1998 |
| WO | WO 99/18250 | 4/1999 |
| WO | WO 99/32363 | 7/1999 |
| WO | WO 99/37826 | 7/1999 |
| WO | WO 00/03933 | 1/2000 |
| WO | WO 2004/094679 | 11/2004 |
| WO | WO 2008/002899 | 1/2008 |
| WO | WO 2008/103629 | 8/2008 |
| WO | WO 2010/117009 | 10/2010 |
| WO | WO 2011/078057 | 6/2011 |
| WO | WO 2012/133391 | 10/2012 |
| WO | WO 2012/144490 | 10/2012 |
| WO | WO 2013/040339 | 3/2013 |

OTHER PUBLICATIONS

"Aerocan and Tubex pick up 2010 aluminium aerosol can awards," Cosmetics Business, Sep. 28, 2010 retrieved from https://www.cosmeticsbusiness.com/news/article_page/Aerocan_and_Tubex_pick_up_2010_aluminium_aerosol_can_awards/56955, 1 page.

"Aluminium in the Packaging Industry: Manufacture, Use, Recycling," Gesamtverband Der Aluminium Industrie e.V., 2006, 16 pages [retrieved online from: www.aluinfo.de/files/_media/dokumente/Downloads/Technische%20Daten/Merkblaetter/W18_Aluminium_in_the_Packaging_Industry.pdf].

"Casthouse Seminar, Fourth edition 1998," Alusuisse Technology & Management Ltd., 1998, 13 pages.

"DIN EN 573-3," DIN, Aug. 2009, 3 pages.

"Impact Extrusion," Wikipedia, Dec. 9, 2009 retrieved from https://web.archive.org/web/20091209012819/http://en.wikipedia.org/wiki/Impact_extrusion, 5 pages.

"Inside a Ball Beverage Can Plant," Ball, Sep. 2002, 1 page [retrieved online from: www.ball.com/Ball/media/Ball/Global/Downloads/How_a_Ball_Metal_Beverage_Can_Is_Made.pdf?ext=.pdf].

"International Alloy Designations and Chemical Composition Limits for Wrought Aluminum and Wrought Aluminum Alloys," The Aluminum Association, Feb. 2009, 37 pages.

Altenpohl, "Aluminium und Aluminiumlegierungen," Springer-Verlag, Berlin, 1965, pp. 24-33.

Cotell et al., "Surface Engineering of Aluminum and Aluminum Alloys," ASM Handbook, vol. 5: Surface Engineering, 1994, pp. 784-804.

Cui et al. "Recycling of automotive aluminum," Transactions of Nonferrous Metals Society of China, Nov. 2010, vol. 20, No. 11, pp. 2057-2063.

Fisher et al. "Recycling—The Effect On Grain Refinement of Commercial Aluminum Alloys," London & Scandinavian Metallurgical Co Limited, 122nd TMS Annual Meeting & Exhibition, Feb. 21-25, 1993, 6 pages.

Goltz "Aluminum Bottles are Successful," University of Wisconsin, 2005, 5 pages [retrieved from: http://www2.uwstout.edu/content/rs/2005/article6.pdf].

Guanglin et al., "Packaging Material Science," Aug. 31, 2011, pp. 243-244 (No English translation available).

Guley et al. "Direct recycling of 1050 aluminum alloy scrap material mixed with 6060 aluminum alloy chips by hot extrusion," International Journal of Material Forming, Apr. 2010, vol. 3, No. Suppl. 1, pp. 853-856.

Herbert, "Manufacturing Processes," Prentice-Hall, Inc., Englewood Cliffs, NJ, excerpts from pp. 548-553, 562-563, 1979, 11 pages.

Lange et al., "Fließpressen," Springer, 2008, pp. 94-95.

Sanders, Jr. "Technology Innovation in Aluminum Products," JOM, Feb. 2001, vol. 53, No. 2, pp. 21-25 (pp. 21-22).

Siegert, "Fließpressen von Aluminium, Band 1" Institut Für Umformtechnik Universtität Stuttgart, Informationsgesellschaft/Verlag, Oct. 6, 1995, p. 183.

Taschauer, "Werkstoffkundliche und verfahrenstechnische Einflusse bei der Herstellung von Aluminium-Aerosolspraydosen," Studienrichtung Werkstoffwissenschaft, Leoben, Nov. 2009, 116 pages.

Taschauer et al., "Einflüsse Auf Die Umformbarkeit Von Aerosolspraydosen," in 4. Sommerschule Umformtechnik Kaltumformung, Jun. 2006, pp. 125-130.

Tekkaya et al. "Hot profile extrusion of AA-6060 aluminum chips," Journal of Materials Processing Technology, Apr. 2009, vol. 209, No. 7, pp. 3343-3350.

Xiao et al., "Practical Manual of Aluminum Processing Technology," Metallurgical Industry Press, Beijing, China, 2005, 14 pages (No English translation available).

International Search Report and Written Opinion for International (PCT) Patent Application No. PT/US23/61967, dated Jun. 2, 2023 21 pages.

\* cited by examiner

METHOD FOR FORMING A CURL AND A THREADED METALLIC CONTAINER INCLUDING THE SAME

CROSS REFERENCE TO RELATED APPLICATIONS

The present application claims priority from U.S. Provisional Patent Application Ser. No. 63/306,755, filed Feb. 4, 2022, entitled "Method for Forming a Curl and a Threaded Metallic Container Including the Same," the entire disclosure of which is hereby expressly incorporated by reference in its entirety.

FIELD

The present disclosure relates generally to the manufacture of metallic containers. More specifically, the present disclosure provides a method for forming a curl on an open end of a threaded metallic container and a threaded metallic container including the same.

BACKGROUND

Metallic containers offer distributors and consumers many benefits. Generally, the configuration and design of a container affects the level to which end consumers, as well as bottlers, manufacturers, distributors, shippers, and retailers, hereinafter referred to collectively as "the bottling industry," are satisfied with a container. In particular, aluminum containers provide ideal surfaces to decorate with brand names, logos, designs, product information, and/or other preferred indicia and thus offer bottlers, distributors, and retailers an ability to stand out at the point of sale. The body of a metallic container also provides enhanced protection properties for beverages, foodstuffs, and other fluids. For example, aluminum containers have a strength-to-weight ratio advantage which enables higher stacking than comparable glass containers. The increased durability of aluminum containers also reduces the number of containers damaged during processing and shipping, resulting in further savings. Additionally, aluminum containers are lighter than glass containers, resulting in energy savings during shipment. Finally, recycling aluminum containers is easier because labels and other indicia are printed directly onto the aluminum containers, while glass and plastic containers typically have labels that must be separated during the recycling process.

Aluminum containers such as beverage bottles, cosmetic pump bottles, and aerosols are particularly attractive to consumers because of the convenience they offer. The light weight of aluminum containers makes them easier to carry. Aluminum containers are particularly suitable for use in public places and outdoors because they are durable, safe, and give effective protection from light and air which may negatively affect the quality or chemical composition of the gas, fluid, or solid product contained in the aluminum container. In addition, aluminum containers cool down faster than containers made of other materials, resulting in improved fluid temperatures. For example, the reduced cool down time may result in a colder beverage more quickly. By way of another example, the reduced cool down time may result in a reduced risk of fluid expansion due to retained heat which may lead to breakage. Glass containers do not offer the same convenience because they are heavier than aluminum containers and are easier to break. Further, some public facilities and parks prohibit glass containers because they pose a safety risk when broken.

As a result of these and other benefits, sales of metallic containers were valued at approximately $53 billion globally in 2014. To meet this demand, metallic container manufacturing facilities operate some of the fastest and most efficient production lines in the container industry. Accordingly, specialized equipment is required for many of the high-speed operations performed to form the metallic containers.

Aluminum containers may be formed using a draw and wall ironing (DWI) process. An example of a known production line to produce DWI metallic containers is generally illustrated and described in "Inside a Ball Beverage Can Plant," available at http://www.ball.com/Ball/media/Ball/Global/Downloads/How_a_Ball_Metal_Beverage_Can_Is_Made.pdf?ext=.pdf (last visited Nov. 21, 2021) which is incorporated herein by reference in its entirety. In one example of a production line, a cupper cuts circular blanks from a lubricated aluminum sheet and forms the blanks into cups. Bodymakers use a punch on a ram to push the cups through a series of tooling dies that redraw and iron the cups into container bodies, with the open ends of the container bodies cut to a uniform height by trimmers. The container bodies are then washed and rinsed with a washer, and dried with an oven. The exterior sidewalls may be given a basecoat with a basecoater and dried in an oven. The exterior sidewalls are then decorated with decorations by one or more decorators, the rim is coated with a lacquer by a bottom coater, and the interior sidewalls are coated with a lacquer with an internal coater, all of which are dried in one or multiple ovens. A waxer applies a thin coat of lubricant to the outside of the metallic container prior to die necking, which shapes the neck of the metallic container. The metallic container may be reprofiled or reformed as desired before being tested, inspected, and palletized.

Aluminum containers may also be formed using an impact extrusion process. Impact extrusion is a process utilized to make metallic containers and other articles with unique shapes. The products are typically made from a softened metal slug comprised of steel, magnesium, copper, aluminum, tin, and other pure or substantially pure metals, alloys, or combination of alloys. The container is formed inside a confining die from the metal slug which is contacted by a punch. The force from the punch deforms the metal slug around an outer diameter of the punch and the inner diameter of the confining die. Additional description related to impact extruded bottles may be found in U.S. Pat. No. 9,517,498, issued on Dec. 13, 2016, which is incorporated herein in the entirety.

After the initial shape is formed, the container is removed from the punch with a counter-punch ejector, and other necking and shaping tools are used to form the device to a preferred shape. Where the aluminum containers are bottled-shaped, the container typically includes a closed bottom portion, a body portion, a neck portion extending upwardly from the body portion, and an opening positioned on an uppermost portion of the neck portion opposite the closed bottom portion. In an example embodiment, the neck portion may be formed by a machine known as a "necker". After the container body is formed into its cylindrical shape, dies of the necker apply pressure to the upper end of the container body to reshape the open end and form the neck. To form the neck, the container body typically passes progressively through several necking dies arranged in series. For example, bodies of two-piece cans typically pass through six or more necking dies. In some production lines, fourteen necking dies are used in a DWI process to successively decrease the diameter of the open end to form the neck. For example, throughput through the necking dies during a DWI process may be up to 2500 containers per minute (e.g., as compared to throughput during an impact extrusion process which may range between 150 and 250 containers per minute). It is noted an impact extrusion process may include, but is not limited to, one necker (or two, in serial arrangement). Metallic containers typically require more necking operations and production lines for metallic containers may include more than thirty necking operations. The necking dies gradually reduce the diameter of the open end of the container body to a final diameter. Additional description related to container necking may be found in U.S. Patent Application Publication No. 2021/0276069, published on Sep. 9, 2021, which is incorporated herein in the entirety.

Following the formation of the neck portion, a thread is applied to a section of the neck portion. In one example, a first piece of a thread forming device may be inserted into the neck portion and positioned proximate to an interior surface of the neck portion, while a second piece of the thread forming device may be positioned proximate to an exterior surface of the neck portion. Each piece applies a force to its respective surface of the neck portion to form threading having a predetermined size, shape, and geometry. The container may be rotated (e.g., about an axial center) so that the first and second pieces move about a circumference of the neck portion during the formation of the threading. Additional description related to threading may be found in in U.S. Pat. No. 9,517,498, issued on Dec. 13, 2016, previously incorporated herein in the entirety.

The metallic containers may be capped with a closure (or enclosure) including, but not limited to, a Roll-On Pilfer Proof (ROPP) closure, a crown closure, or a threaded cosmetic pump closure. The closure may include a gasket. For example, the gasket may prevent contained fluid from leaking or spilling from the metallic container. By way of another example, the gasket may retain pressure within the metallic container. Coupling the closure to a metallic container with an edge or lip may cut or otherwise damage the gasket (or the closure itself), reducing the effectiveness of a seal. Damaging the gasket may be especially problematic where the metallic container is an aerosol canister with pressurized contents. In addition, the effectiveness may be further reduced by repeated coupling and uncoupling (e.g., attachment and removal) of the closure, further reducing the effectiveness of the gasket and/or marring the finish of the closure. Further, when the closure is tightened against the metallic container, the gasket is compressed between the closure and an upper end of the neck portion. In some instances, the gasket is cut by the upper end of the neck portion. Such damage to the gasket and/or marring the finish of the closure may cause fluid leakage between the closure and the metallic container.

SUMMARY

Accordingly, there is a need for a metallic container configured to avoid or reduce damage to the closure. The metallic container should also be configured to reduce or eliminate damage to a gasket installed within the closure. The metallic container can be a single-use or refillable container. The metallic container can be configured to engage with a gasket (e.g., fabricated from a polymer such as an elastomer (e.g., rubber), a plastic, or the like) proximate to an opening of the metallic container, for gas or fluid products (e.g., aerosols, and the like). The metallic container can be configured to engage with or receive a tamper indicator or freshness sealer (e.g., a partial or full layer fabricated from paper, plastic, metal, or combinations thereof) that is couplable to the metallic container (e.g., via adhesion, or the like) proximate to an opening of the metallic container, for gas, fluid, or solid products (e.g., vitamins, tablets, herbs, spices, and the like).

Embodiments are directed to a threaded metallic container including a curl. Embodiments are also directed to a sealed or sealable container including the metallic container with the curl, a closure, and an insert positioned between the metallic container and the closure, where a seal is generated between the insert and the curl of the metallic container. Embodiments are also directed to methods or processes for forming the curl on the metallic container, as well as coupling/uncoupling the closure from the metallic container and engaging the insert to/disengaging the insert from the curl.

In some embodiments, the curl is formed on a portion of a neck of the metallic bottle. For example, the curl may be rounded or may include a flattened upper surface. The curl is positioned on the metallic bottle above a thread portion. In some embodiments, the curl may form or define an opening into the neck, that leads to a hollow interior of a body of the metallic container.

In some embodiments, the insert is a gasket, a tamper indicator, or a freshness sealer. Where the insert is a tamper indicator or freshness sealer (e.g., a partial or full layer fabricated from paper, plastic, metal, or combinations thereof) configured to engage with the metallic container (e.g., either during or prior to coupling of a closure), the tamper indicator or freshness sealer may at least partially couple to the curl. In one non-limiting example, the tamper indicator or freshness sealer may be a partial or full layer fabricated from paper, plastic, metal, or combinations thereof inserted in a cavity defined within the closure, such that coupling the closure to the metallic body causes the tamper indicator or freshness sealer to engage the curl. In another non-limiting example, the tamper indicator or freshness sealer may be a partial or full layer fabricated from paper, plastic, metal, or combinations thereof that adheres to the curl along an upper contact edge (e.g., where the curl is rounded) and/or an upper contact surface (e.g., where the curl is at least partially flattened) prior to installation of the closure. In another non-limiting example, the tamper indicator or freshness sealer may be a foil layer that at least partially wraps around the curl prior to installation of a closure, and may further make contact with at least a portion of the thread on the neck.

In some embodiments, the curl includes a coating, which may be similar to (or different from) a coating applied to an interior cavity defined within the body and/or an interior cavity defined within the neck and proximate to the opening of the neck. It is noted the insert (e.g., the gasket, tamper indicator, or freshness sealer) may benefit from adhesion to the coating applied to the curl. In particular, the coating may secure the tamper indicator or freshness sealer to the metallic container, either alone or in combination with an adhesive applied to the tamper indicator or freshness sealer.

In at least one embodiment, a sealable metallic container includes a body with a hollow interior, a closed bottom, and a neck extending away from the closed bottom. The neck includes a thread, a curl formed from a curl portion of the neck above the thread, and a transition portion between the thread profile and the curl portion. The curl defines an opening of the body. The thread of the neck is configured to engage a corresponding closure thread of a closure when the closure is coupled to the neck. The curl is configured to engage an insert positioned proximate to the curl and generate a seal between the insert and the curl. The curl is configured to increase the contact surface between the neck and the insert by an amount at least twice a thickness or gauge of a metal forming the curl portion. The curl is configured to reduce damage to the insert during at least one of the closure being coupled to or uncoupled from the neck.

In some embodiments, the curl is rounded. In other embodiments, the curl includes an upper surface that is generally planar. The upper surface is configured to increase contact surface area between the curl and the insert. In some embodiments, the curl has a first exterior diameter and the thread has a second exterior diameter that is greater than the first exterior diameter. In some embodiments, the curl has a first exterior diameter and the thread has a second exterior diameter that is less than the first exterior diameter. In some embodiments, the seal generated between the insert and the curl is configured to hold at least one of a gas, a fluid, or a solid product within the hollow interior of the body, and the insert is a gasket, a tamper indicator, or a freshness sealer. In some embodiments, the metal includes an aluminum alloy.

In other embodiments, a sealable container with a removable closure includes a metallic body with a hollow interior, a closed bottom, a neck extending away from the closed bottom, a body thread formed on a portion of the neck, a curl positioned at an end of the neck and formed in a curl portion above the body thread, an opening defined by the curl, and a transition portion positioned between the body thread and the curl portion.

The sealable container includes a closure. In some embodiments, the closure is reusable. In one or more embodiments, the closure includes a closure thread that is formed before the closure is coupled to the neck of the metallic body.

The closure includes a casing and a closure thread associated with the casing. The sealable container includes an insert positioned proximate to the curl. The body thread of the neck is configured to engage the closure thread when the closure is coupled to the neck. The curl is configured to engage with the insert and generate a seal between the insert and the curl and seal the opening of the metallic body. The curl is configured to increase the contact surface between the neck and the insert by an amount at least twice a thickness or gauge of a metal forming the curl portion. The curl is configured to reduce damage to the insert during at least one of the closure being coupled to or uncoupled from the neck.

In some embodiments, the curl has an upper surface that is flattened to define a planar section. The upper surface is configured to further increase the contact surface between the curl and the insert.

In at least one embodiment, the flattened upper surface has a first width measured in a lateral direction. The metal forming the curl has a first thickness. In some embodiments, the first width is at least two times the first thickness.

The metal of the neck optionally has a second thickness. In some embodiments, the first thickness of the curl is greater than the second thickness.

Additionally, or alternatively, a portion of the body of the sealable container may have a third thickness proximate to the closed end. In at least one embodiment, the first thickness of the curl is greater than the third thickness.

In some embodiments, the insert is a gasket configured to seal a gas or a fluid product within the hollow interior of the metallic body. The insert is installed in a cavity defined within the casing prior to the closure coupling to the neck. The closure includes a gas or fluid channel in communication with a dispenser. At least a portion of the gas or fluid channel is configured to fit within the opening defined by the curl. In some embodiments, the closure includes a cosmetic pump, a pharmaceutical pump, a splay closure, or an aerosol closure.

In some embodiments, the insert is a tamper indicator or a freshness sealer configured to seal a fluid or a solid within the hollow interior of the metallic body. The insert is installed within a cavity defined within the casing prior to the closure coupling to the neck, and configured to engage the curl when the closure is coupled to the neck. Alternatively, the insert is configured to engage the curl prior to the closure coupling to the neck.

In another embodiment, a method or process for forming a sealable container includes, but is not limited to, forming a metallic body with a hollow interior, a closed bottom, a neck with a reduced diameter extending away from the closed bottom, and an opening at an end of the neck. In some embodiments, a method or process for fabricating a sealable container includes, but is not limited to, forming a thread on a portion of the neck, wherein a non-threaded portion of the neck is positioned between the opening and the thread, wherein the thread is configured to engage a corresponding closure thread of a closure when the closure is coupled to the neck.

In other embodiments, a method or process for fabricating a sealable container includes, but is not limited to, necking the non-threaded portion to form a curl portion adjacent to the opening and a transition portion between the curl portion and the thread. In another embodiment, a method or process for fabricating a sealable container includes, but is not limited to, curling the curl portion outwardly or inwardly to form a curl, wherein the curl defines a diameter of the opening. The curl is configured to engage an insert positioned proximate to the curl and generate a seal between the insert and the curl. The curl is configured to increase the contact surface between the neck and the insert by an amount at least twice a thickness or gauge of a metal forming the curl portion. The curl is configured to reduce damage to the insert during at least one of the closure being coupled to or uncoupled from the neck.

In some embodiments, a method or process for fabricating a sealable container includes, but is not limited to, performing one or more surface-refining processes on the curl portion prior to curling the curl portion to form the curl. The one or more surface-refining processes include a polishing, grinding, sanding, milling, a cutting, or a coating application process (e.g., a varnish, lacquer, or the like). In some embodiments, the coating application process applies a coating to the curl that promotes increased adhesion between the insert and the curl when the insert and the curl engage.

In another embodiment, a method or process for fabricating a sealable container includes, but is not limited to, forming a flattened upper surface on the curl. The flattened upper surface is configured to further increase the contact surface between the curl and the insert.

In some embodiments, a method or process for fabricating a sealable container includes, but is not limited to, coupling the closure to the metallic body. The closure includes a casing, a gas or fluid channel, a dispenser, and the insert in a cavity defined within the casing, where the insert is a gasket. At least a portion of the gas or fluid channel is configured to fit within the opening defined by the curl.

In some embodiments, a method or process for fabricating a sealable container includes, but is not limited to, engaging the insert with the curl when the closure is coupled to the metallic body, where engaging the curl with the insert generates a seal to hold a gas or a fluid product within the hollow interior of the metallic body.

In some embodiments, a method or process for fabricating a sealable container includes, but is not limited to, uncoupling the closure from the metallic body. In some embodiments, a method or process for fabricating a sealable container includes, but is not limited to, disengaging the insert from the curl when the closure is uncoupled from the metallic body. Disengaging the insert from the curl breaks the generated seal.

In some embodiments, a method or process for fabricating a sealable container includes, but is not limited to, coupling the closure to the metallic body. The closure includes a casing and the insert positioned in a cavity defined within the casing, where the insert is a tamper indicator or a freshness sealer.

In some embodiments, a method or process for fabricating a sealable container includes, but is not limited to, engaging the curl with the insert when the closure is coupled to the metallic body. Engaging the curl with the insert generates a seal to hold a fluid or a solid product within the hollow interior of the metallic body.

In some embodiments, a method or process for fabricating a sealable container includes, but is not limited to, uncoupling the closure from the metallic body. In some embodiments, a method or process for fabricating a sealable container includes, but is not limited to, disengaging the insert from the curl when the closure is uncoupled from the metallic body. Disengaging the insert from the curl breaks the seal to release the fluid or the solid product.

In some embodiments, a method or process for fabricating a sealable container includes, but is not limited to, engaging the curl with the insert prior to coupling the closure to the metallic body, wherein engaging the curl with the insert generates a seal to hold a fluid or a solid product within the hollow interior of the metallic body. The insert is a tamper indicator or a freshness sealer. In some embodiments, a method or process for fabricating a sealable container includes, but is not limited to, coupling the closure to the metallic body. The closure includes a casing and a cavity defined within the casing. The insert is positioned within the cavity when the closure is coupled to the metallic body. Accordingly, in some embodiments, to access a product in the hollow interior of the metallic body, the insert must be at least partially removed from the curl. Additionally, or alternatively, the insert may be cut or penetrated to permit access to the product.

In some embodiments, a method or process for fabricating a sealable container includes, but is not limited to, uncoupling the closure from the metallic body. In some embodiments, a method or process for fabricating a sealable container includes, but is not limited to, disengaging the insert from the curl after the closure is uncoupled from the metallic body. Disengaging the insert from the curl breaks the seal to permit access to the fluid or the solid product within the metallic body.

In some embodiments, after necking the non-threaded portion, the curl portion has a shape that is generally toroidal or cylindrical. In some embodiments, the transition portion has a first diameter that is greater than a second diameter of the curl portion. In some embodiments, an outer diameter of the curl is less than an outer diameter of the thread.

In some embodiments, a method or process for fabricating a container configured to hold a fluid includes, but is not limited to, positioning a metallic slug in a die, impacting the metallic slug with a punch to form an extruded tube, and shaping the extruded tube to form the metallic body with a preferred shape. In some embodiments, the metallic slug comprises an aluminum alloy.

Another aspect of the disclosure is a metallic container with a reusable closure, comprising: (1) a metallic body with a hollow interior, a closed bottom, a neck with a reduced diameter extending away from the closed bottom, a thread formed on a thread portion of the neck, a curl portion positioned above the thread portion, a curl formed in a portion of the curl portion, an upper portion of the curl having a width at least twice a thickness or gauge of a metal forming the curl portion, and an opening defined by the curl and positioned at an end of the neck; (2) a product contained within the hollow interior of the metallic body; (3) a tamper indicator adhered to the curl to seal the opening; and (4) a reusable closure coupled to the neck, the reusable closure comprising a closure thread facing inwardly to engage the thread of the metallic body, the closure thread formed before the reusable closure is coupled to the neck, wherein the reusable closure is configured to uncouple from the neck without damage to the tamper indicator.

In one or more embodiments, an upper surface of the curl is flattened to form a planar area to increase a surface area of the upper surface to improve adhesion of the tamper indicator.

In some embodiments, a vertical cross section of the curl comprises a first curved portion facing inwardly, a second curved portion opposite to the first curved portion, and a planar area positioned between the first and second curved portions.

In some embodiments, the upper surface of the curl and its planar area is flattened by removing material from the curl.

In at least one embodiment, a material of the curl has a first thickness measured in a lateral direction perpendicular to a vertical axis of the metallic container, the planar area has a first width measured in the lateral direction, and the first width is at least two times greater than the first thickness.

The metallic container may comprise one or more of the previous embodiments, and optionally the product is at least one of a gas, a fluid, and a solid.

In one or more embodiments, the tamper indicator comprises one or more of a metal, a plastic, and a paper.

In some embodiments, the tamper indicator is adhered to the curl with an adhesive.

In some embodiments the closure comprises a body formed of a plastic.

Additionally, or alternatively, the closure may comprise a metal.

The Summary is neither intended nor should it be construed as being representative of the full extent and scope of the present disclosure. The present disclosure is set forth in various levels of detail in the Summary as well as in the attached drawings and the Detailed Description and no limitation as to the scope of the present disclosure is intended by either the inclusion or non-inclusion of elements, components, etc. in this Summary. Additional aspects of the present disclosure will become more clear from the Detailed Description, particularly when taken together with the drawings.

As used herein, the term "metallic container" means a container formed by any method known to those of skill in the art. For example, a metallic container of the present disclosure may be formed by a draw and wall ironing process. Alternatively, an impact extrusion process may be used to form a metallic container of the present disclosure.

In addition, metallic containers of the present disclosure may have any size or shape and be configured to store any type of product.

The terms "metal" or "metallic" as used hereinto refer to any metallic material that may be used to form a container, including without limitation aluminum, steel, tin, copper, and any combination thereof.

The phrases "at least one," "one or more," and "and/or," as used herein, are open-ended expressions that are both conjunctive and disjunctive in operation. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

The term "a" or "an" entity, as used herein, refers to one or more of that entity. As such, the terms "a" (or "an"), "one or more" and "at least one" can be used interchangeably herein.

Unless otherwise indicated, all numbers expressing quantities, dimensions, conditions, ratios, ranges, and so forth used in the specification and claims are to be understood as being modified in all instances by the term "about" or "approximately". Accordingly, unless otherwise indicated, all numbers expressing quantities, dimensions, conditions, ratios, angles, ranges, and so forth used in the specification and claims may be increased or decreased by approximately 5% to achieve satisfactory results. Additionally, where the meaning of the terms "about" or "approximately" as used herein would not otherwise be apparent to one of ordinary skill in the art, the terms "about" and "approximately" should be interpreted as meaning within plus or minus 10% of the stated value.

The term "parallel" means two objects are oriented at an angle within plus or minus 0° to 5° unless otherwise indicated. Similarly, the term "perpendicular" means two objects are oriented at angle of from 85° to 95° unless otherwise indicated.

Unless otherwise indicated, the term "substantially" indicates a difference of from 0% to 5% of the stated value is acceptable.

All ranges described herein may be reduced to any sub-range or portion of the range, or to any value within the range without deviating from the invention. For example, the range "5 to 55" includes, but is not limited to, the sub-ranges "5 to 20" as well as "17 to 54."

The use of "including," "comprising," or "having" and variations thereof herein is meant to encompass the items listed thereafter and equivalents thereof as well as additional items. Accordingly, the terms "including," "comprising," or "having" and variations thereof can be used interchangeably herein.

It shall be understood that the term "means" as used herein shall be given its broadest possible interpretation in accordance with 35 U.S.C., Section 112(f). Accordingly, a claim incorporating the term "means" shall cover all structures, materials, or acts set forth herein, and all of the equivalents thereof. Further, the structures, materials, or acts and the equivalents thereof shall include all those described in the Summary, Brief Description of the Drawings, Detailed Description, Abstract, and Claims themselves.

BRIEF DESCRIPTION OF THE DRAWINGS

The accompanying drawings, which are incorporated in and constitute a part of the specification, illustrate embodiments of the disclosed system and together with the general description of the disclosure given above and the detailed description of the drawings given below, serve to explain the principles of the disclosed system(s) and device(s).

Figure 1:
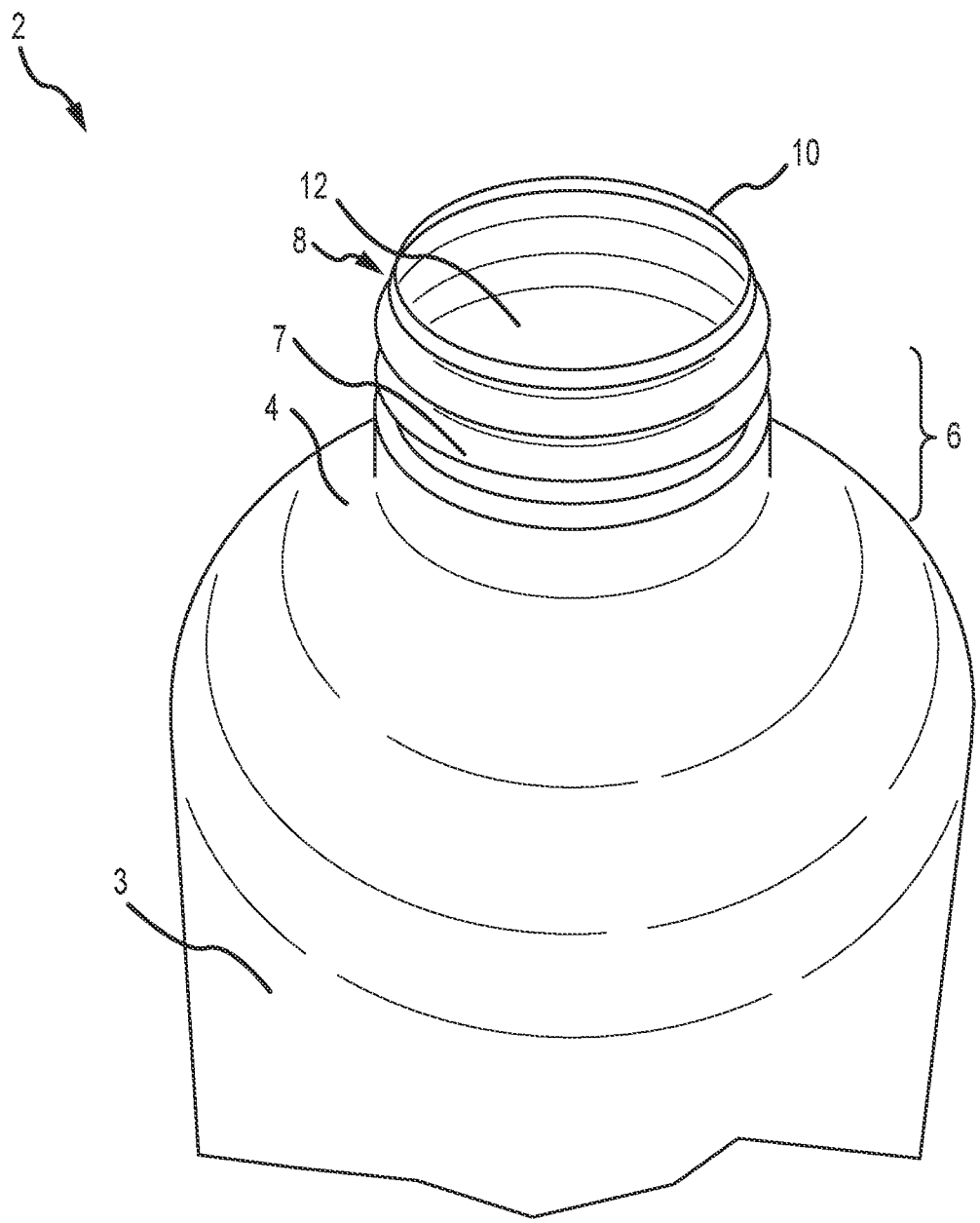
FIG. 1 illustrates a perspective view of a metallic container with a threaded, non-curled neck.

The drawings are not necessarily (but may be) to scale. In certain instances, details that are not necessary for an understanding of the disclosure or that render other details difficult to perceive may have been omitted. It should be understood, of course, that the disclosure is not necessarily limited to the embodiments illustrated herein. As will be appreciated, other embodiments are possible using, alone or in combination, one or more of the features set forth above or described below. For example, it is contemplated that various features and devices shown and/or described with respect to one embodiment may be combined with or substituted for features or devices of other embodiments regardless of whether or not such a combination or substitution is specifically shown or described herein.

The following is a listing of components according to various embodiments of the present disclosure, and as shown in the drawings:

| Number | Component |
|---|---|
| 2 | Metallic Container |
| 3 | Body |
| 4 | Neck |
| 6 | Thread Section |
| 7 | Thread |
| 8 | Non-Threaded Portion |
| 10 | Edge or Lip |
| 12 | Opening |
| 14 | Neck Height |
| 16 | Neck Diameter |
| 18 | Thread Depth |
| 20 | Exterior Thread Diameter |
| 22 | Lip Height |
| 23 | Body |
| 24 | Metallic Container |
| 25 | Closed Bottom |
| 26 | Neck |
| 27 | Hollow Interior |
| 28 | Thread Section |
| 29 | Shoulder |
| 30 | Curl |
| 31 | Non-Threaded Portion |
| 32 | Curl Interior Surface |
| 33 | Threads |
| 34 | Opening |
| 35 | First Curved Portion of Curl |
| 36 | Transition Portion |
| 37 | Second Curved Portion of Curl |
| 38 | External Diameter of the Threads |
| 39 | Thickness or Gauge |
| 40 | Internal Diameter of the Curl |
| 41 | Curl Radius |
| 42 | External Diameter of the Curl |
| 44 | Thread Pitch |
| 45 | Retention Bead or Shoulder |
| 46 | Non-Threaded Portion |
| 48 | First Diameter |
| 50 | Second Diameter |
| 52 | Curl Portion |
| 54 | Modified Curl Portion |
| 56 | Third Diameter |
| 58 | Central Axis |
| 60 | Upper Surface or Planar Portion of Curl |
| 61 | Width of Upper Surface or Planar Portion |
| 62 | Sealed Container |
| 64 | Closure |
| 66 | Gas or Fluid Channel |
| 68 | Dispenser |
| 70 | Closure Thread |
| 72a, 72b | Casing |
| 74 | Gasket |
| 75 | Closure Cavity |
| 76 | Interior Closure Surface |
| 78 | Sealed Container |
| 80 | Closure |
| 82 | Closure Thread |
| 84 | Casing |
| 86 | Tamper Indicator or Freshness Sealer |
| 87 | Cavity |
| 88 | Interior Closure Surface |
| 90 | Coating |
| 100 | Method or Process |
| 102, 104 | |
| 106, 108 | |
| 110, 112, 114 | Steps |
| 200 | Method or Process |
| 202, 204 | |
| 206, 208, 210 | Steps |

DETAILED DESCRIPTION

The present disclosure generally relates to a method for forming a curl, and a threaded metallic container including the same. Embodiments of the present disclosure are directed to a metallic container that includes a neck with a formed curl. The formed curl may be configured to engage with a closure and/or a gasket, a tamper indicator, or a freshness sealer in a non-interfering manner. The formed curl may reduce or prevent damage to the closure and/or the gasket, the tamper indicator, or the freshness sealer that may be caused by a neck without a curl. In addition, the formed curl may prevent injury to a user (e.g., while drinking or otherwise accessing contents within the metallic container) that may be caused by interaction with a neck without a curl. Embodiments of the present disclosure are also directed to forming the metallic container, including forming the curl on the metallic container, as well as coupling/uncoupling a closure to the metallic container to cause a gasket, a tamper indicator, or a freshness sealer to engage with/disengage from the curl.

Figure 2:
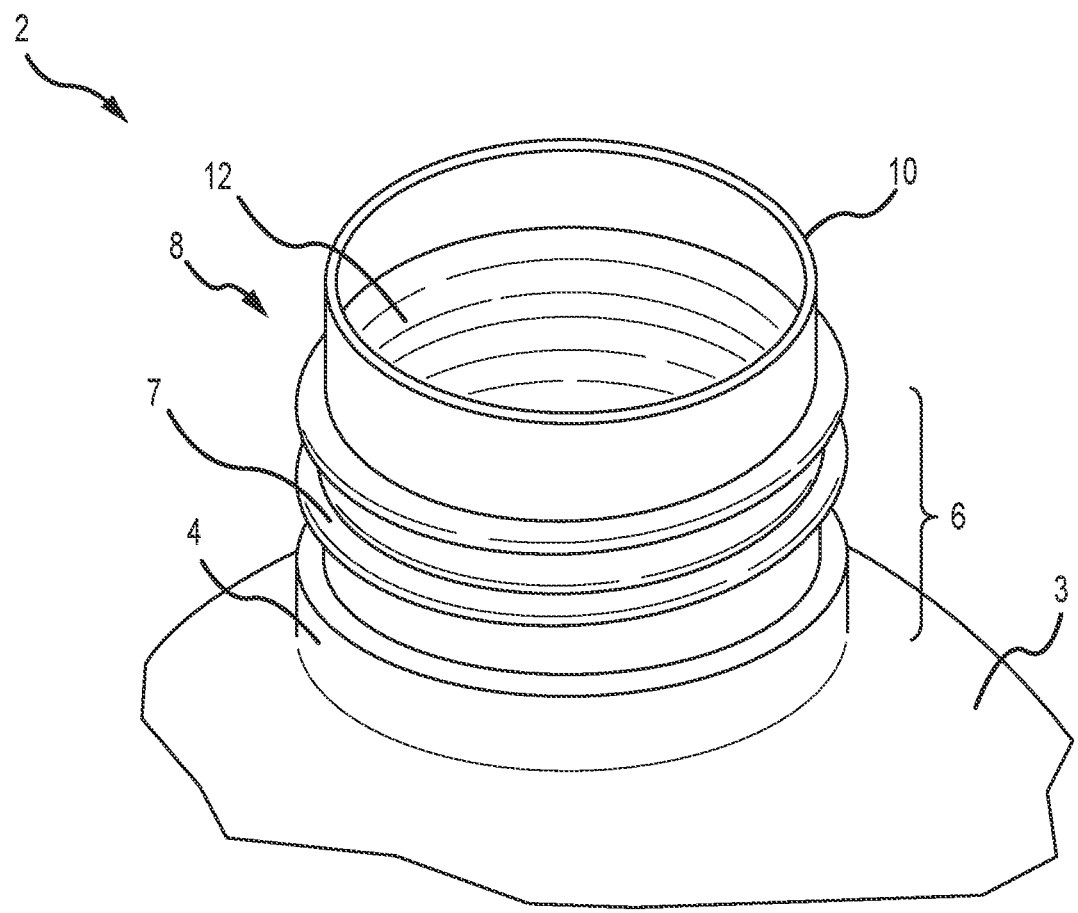
FIG. 2 is another perspective view of the metallic container with a threaded, non-curled neck of FIG. 1.
Figure 3:
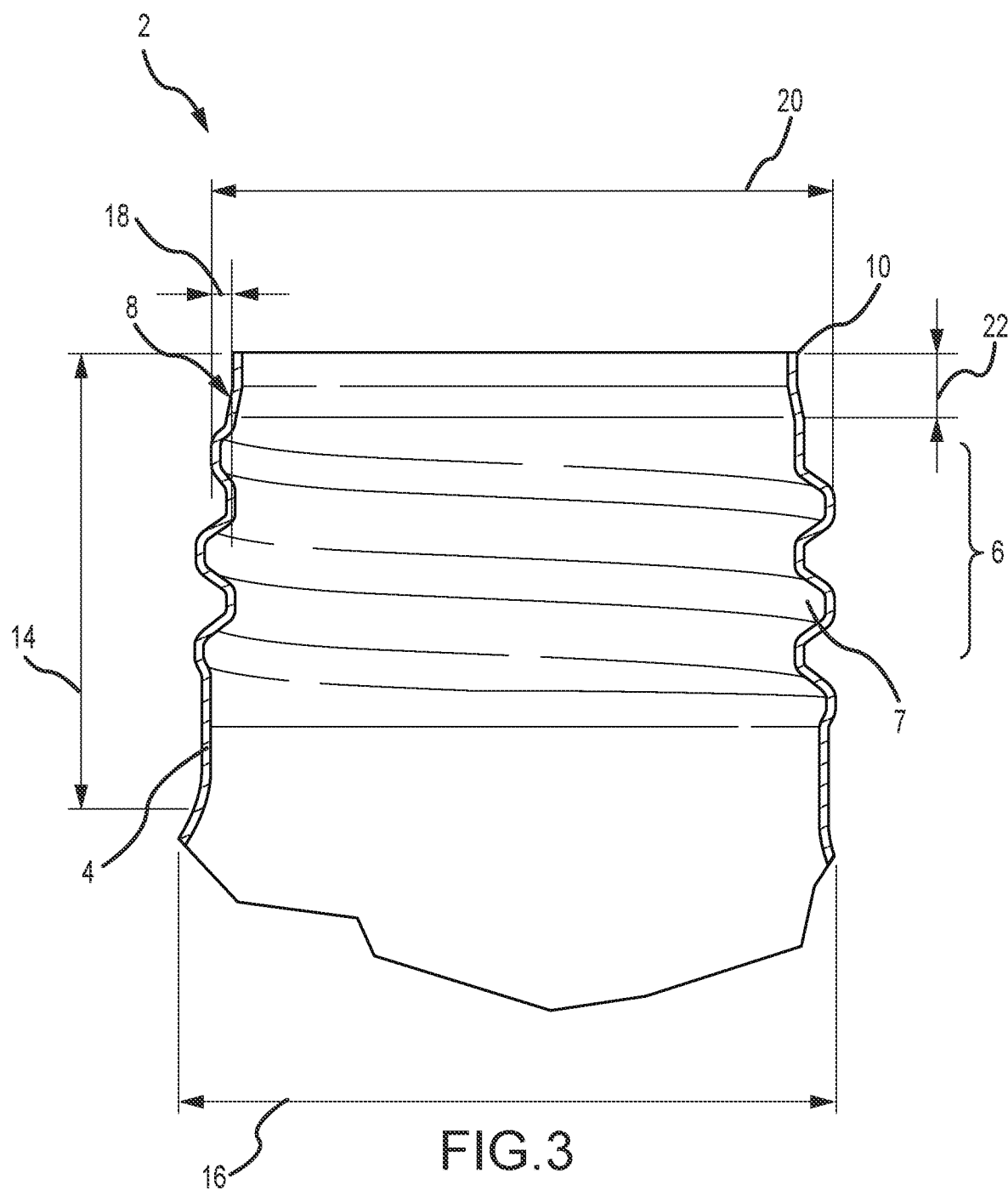
FIG. 3 is a front elevation cross-sectional view of the metallic container with a threaded, non-curled neck of FIG. 1.

FIGS. 1-3 illustrate a metallic container 2. The metallic container 2 includes a body 3 with a closed bottom and a neck 4 extending away from the closed bottom. The body 3 has a hollow interior. The neck 4 includes a thread section 6. The thread section 6 may have one or more threads 7. The threads 7 may have a geometry and dimensions defined by Glass Container Manufacturers Institute (GCMI) standards, which are one norm to describe threads often used for various closures such as manually operated pumps, cosmetic pumps, pharmaceutical pumps, spray closures, or aerosol closures.

The neck 4 includes a non-threaded portion 8 above the thread section 6. The non-threaded portion 8 terminates at an edge or lip 10 surrounding an opening 12.

In one non-limiting example, as illustrated in FIG. 3, the neck 4 may include a neck height 14 of between approximately 0.62 inches (16 millimeters (mm)) and approximately 0.94 inches (24 mm), or approximately 0.79 inches (20 mm). The neck may have a width or a diameter 16 of between approximately 0.98 inches (25 mm) and 1.18 inches (30 mm), or approximately 1.09 inches (27.8 mm). The thread section 6 may include a thread depth 18 of between approximately 0.035 inches (0.9 mm) and approximately 0.063 inches (1.6 mm), or approximately 0.047 inches (1.20 mm). The thread 7 may have an exterior thread diameter 20 of between approximately 0.98 inches (25 mm) and approximately 1.14 inches (29 mm), or approximately 1.07 inches (27.15 mm). The non-threaded portion 8 may include a lip height 22 of between approximately 0.039 inches (1 mm) and 0.20 inches (5 mm), or approximately 0.12 inches (3.0 mm).

Figure 10:
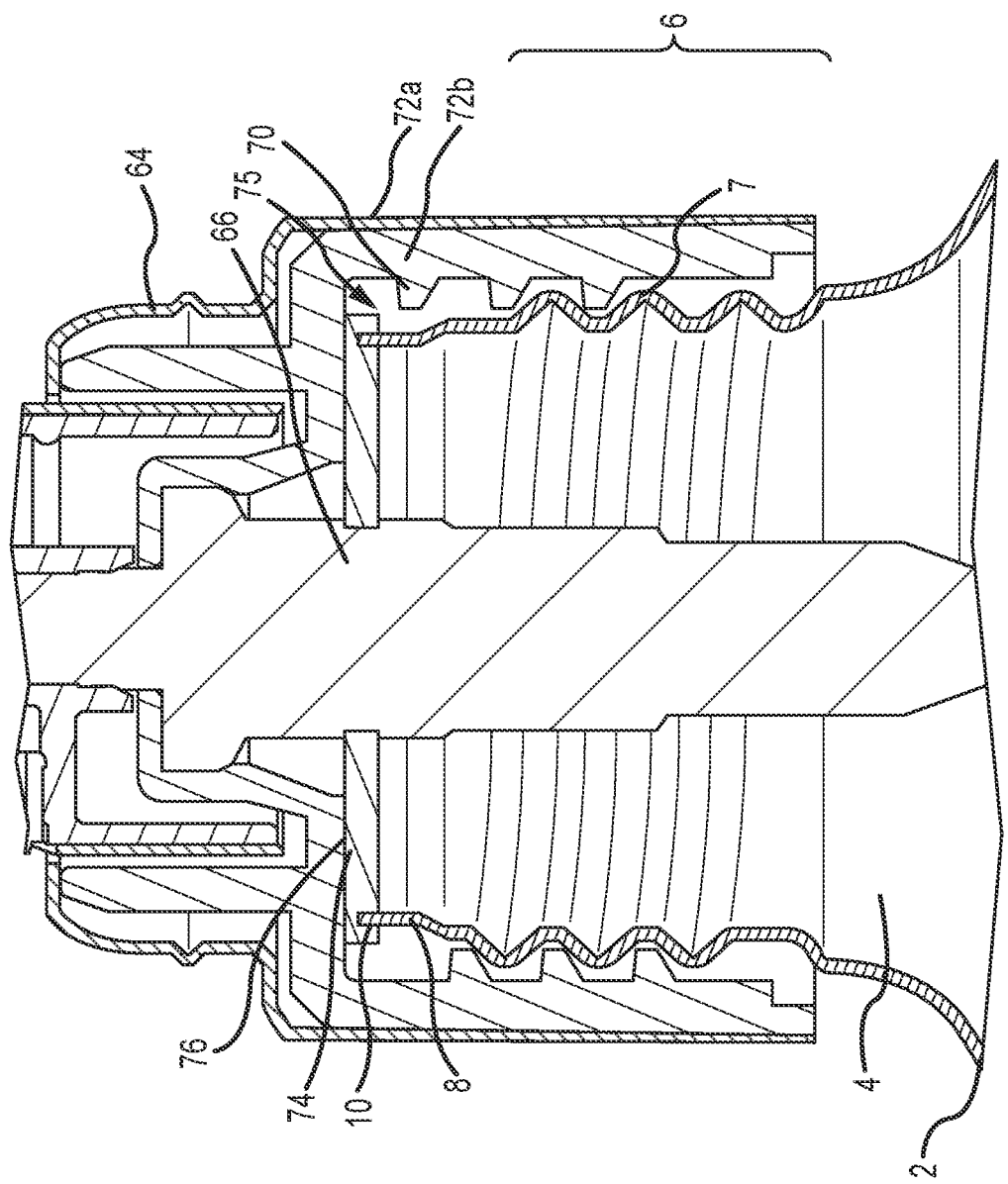
FIG. 10 illustrates an apparatus including a pump assembly with gasket coupled to the metallic container with a threaded, non-curled neck of FIG. 1, for comparison to FIG. 9.

The edge or lip 10 is non-curled in FIGS. 1-3 (and FIG. 10, described in detail herein). For example, the edge or lip 10 of the metallic container 2 is unfinished. When a closure (e.g., as illustrated in FIG. 10) is installed on the metallic container 2, the unfinished lip 10 may contact the closure and/or a gasket (e.g., as illustrated in FIG. 10) within the closure. Repeated coupling and uncoupling (e.g., attachment and removal) of the closure may result in the gasket (or the closure itself) being damaged (e.g., cut), reducing the effectiveness of the gasket. In addition, the unfinished lip 10 may mar the finish of the closure. Reducing the effectiveness of the gasket and/or marring the finish of the closure may cause fluid leakage between the closure and the metallic container to occur. For example, the leakage may increase or become more prevalent through repeated coupling and uncoupling of the closure from the metallic container 2, as the gasket is repeatedly cut and/or the finish is marred.

Figure 4:
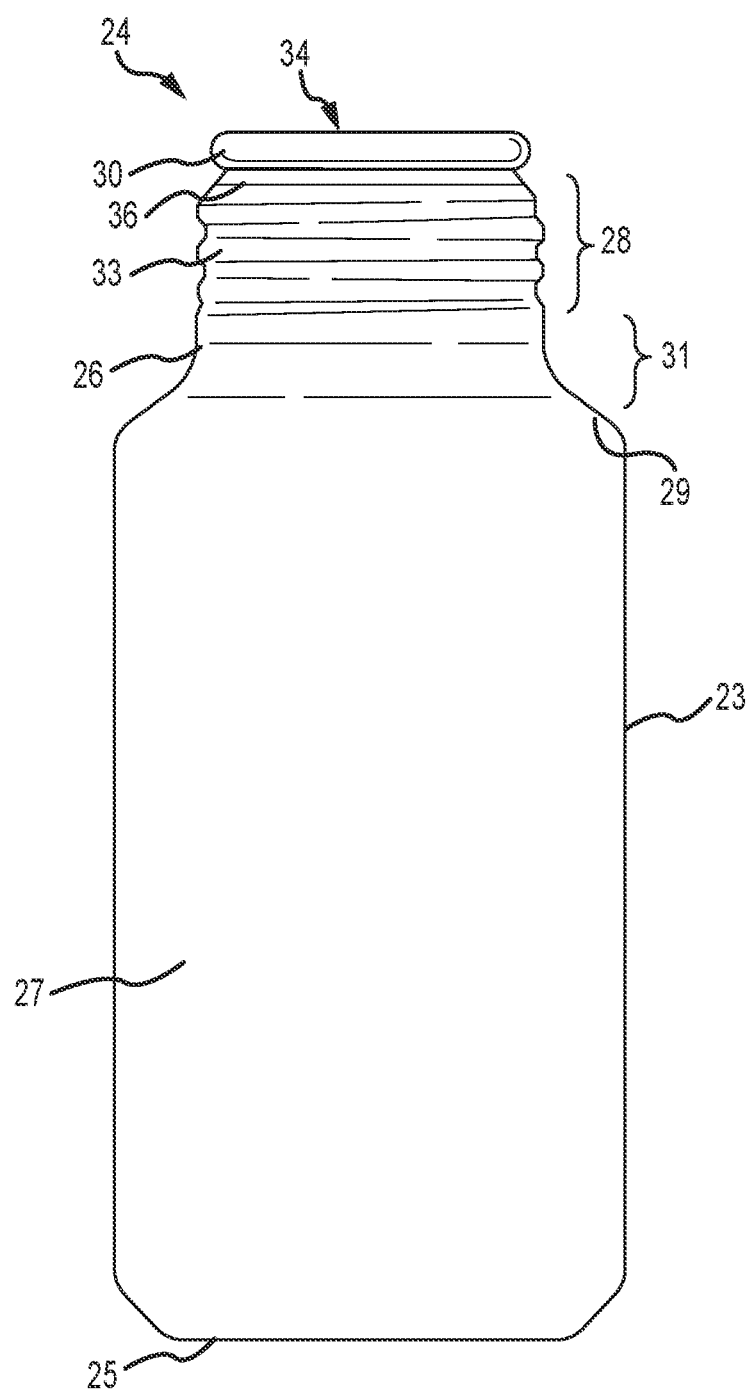
FIG. 4 illustrates a front elevation schematic view of a metallic container with a threaded and curled neck, in accordance with one or more embodiments of the present disclosure.
Figure 5A:
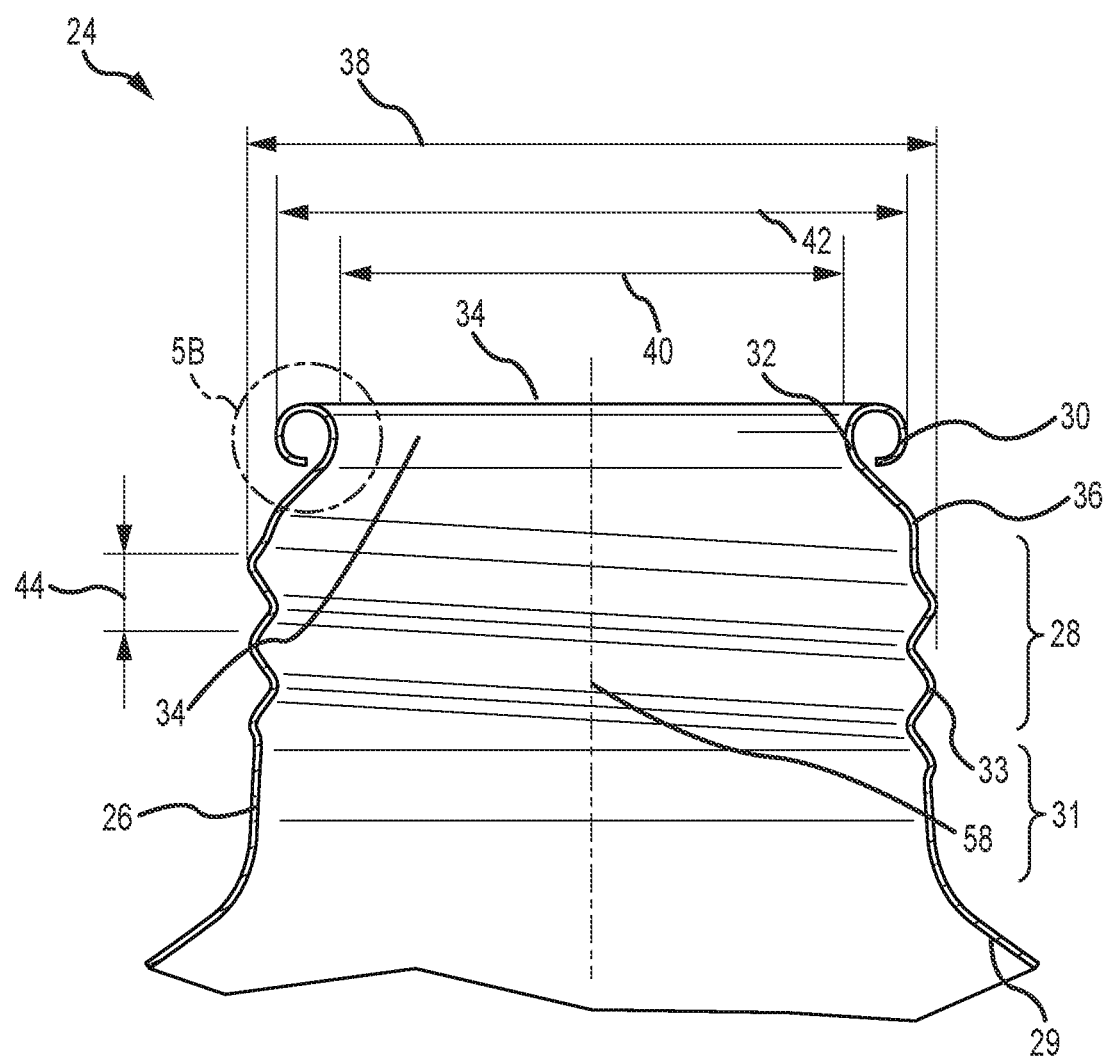
FIG. 5A illustrates a front elevation cross-sectional view of the metallic container of FIG. 4 with section B, in accordance with one or more embodiments of the present disclosure.
Figure 5B:
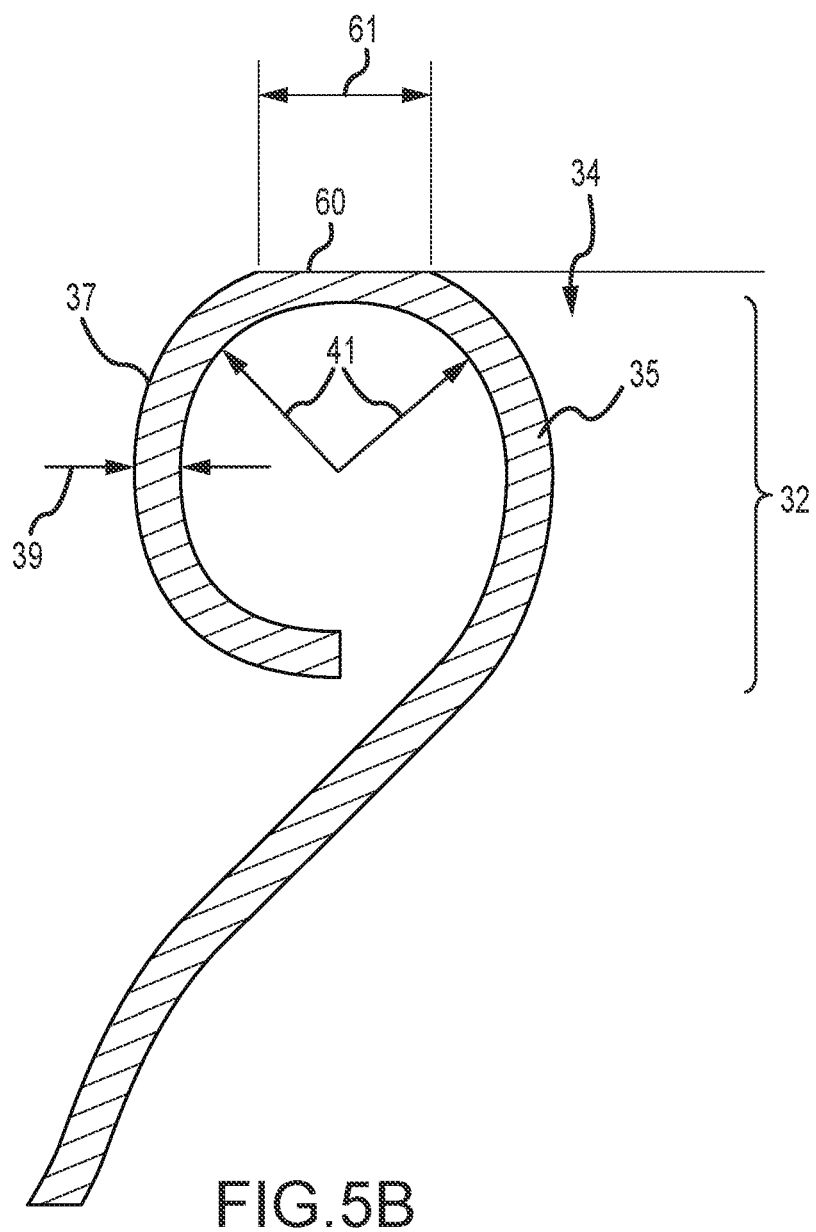
FIG. 5B is an expanded cross-section view at section B of FIG. 5A, in accordance with one or more embodiments of present disclosure.

FIGS. 4, 5A, and 5B in general illustrate a metallic container 24 configured to hold a gas, fluid, or solid product, in accordance with one or more embodiments of the present disclosure. For example, the metallic container 24 may be a metallic bottle. The metallic container 24 includes a body 23 with a closed bottom 25 and a neck 26 extending away from the closed bottom 25. The body 23 has a hollow interior 27. Where the neck 26 includes a smaller diameter than the body 23 and/or the closed bottom 25, the metallic container 24 includes a shoulder 29 that provides a transition between the body 23 and the neck 26. It is noted the shoulder 29 may be a smooth or undulating transition surface, or may instead include one or more protrusions that extend outward from (or recesses that extend inward to) the transition surface.

The neck 26 includes a thread section 28 and a curl 30 above the thread section 28. For example, the thread section 28 does not extend downward into the shoulder 29, such that there is a lower non-threaded portion 31 of the neck 26. For instance, a diameter of the lower non-threaded portion 31 may be substantially constant, or may change (e.g., generally increase, generally decrease, or having multiple varied diameters) in a downward direction from the thread section 28 to the shoulder 29. It is noted, however, that the thread section 28 may extend downward to the neck 26 to abut against the shoulder 29, without departing from the scope of the present disclosure. The curl 30 is a rounded portion that removes or replaces an edge on the neck 26 (e.g., such as the edge or lip 10 illustrated in FIGS. 1-3 and 10).

The curl 30 includes a curved interior surface 32 which forms an opening 34. Referring now to FIG. 5B, the curl 30 includes a first curved portion 35 (e.g., some or all of the curved interior surface 32) and a second curved portion 37. For example, the first curved portion 35 may directly transition to the second curved portion 37. By way of another example, the first curved portion 35 may transition to the second curved portion 37 via an optional intermediate planar portion 60 having a width 61. The material (e.g., metal) forming the first curved portion 35 and/or the second curved portion 37 includes a thickness or gauge 39.

The curl 30 includes a radius 41. For example, the radius 41 may be substantially similar around the entire curl 30. By way of another example, the radius 41 may be a first radius for the first curved portion 35 of the curl 30, and a second radius for the second curved portion 37 of the curl 30. It is noted the difference in radius may be caused by the forming of the curl 30 and/or the forming of the planar portion 60 of the curl 30 via flattening. The radius 41 of the curl 30 is such that the curl 30 is configured to increase a contact surface between the neck 26 and an insert (e.g., a gasket 74 or tamper indicator or freshness sealer 86, described in detail herein) by an amount at least twice the thickness 39 of the material forming the curl 30.

In at least one embodiment, the width 61 of the flattened upper surface 60 is at least two times the thickness 39. The metal of the neck 26 optionally has a second thickness. In some embodiments, the thickness 39 of the curl is greater than the second thickness. Additionally, or alternatively, a portion of the body 23 may have a third thickness. In at least one embodiment, the thickness 39 of the curl is greater than the third thickness.

In at least one embodiment, the metal of the curl 30 has a first thickness measured in a lateral direction perpendicular to a vertical axis of the body 23. In addition, a portion of the body 23 proximate to the closed bottom 25 has a second thickness measured in the lateral direction that is less than the first thickness. Optionally, the upper surface 60 of the curl 30 is flattened to form a planar area that has a first width 61 measured in the lateral direction, where the first width 61 is at least two times greater than the first thickness of the metal of the curl 30. It is noted the first width 61 may be measured in the lateral direction perpendicular to a vertical axis of the body 23.

The neck 26 includes a transition portion 36 between the thread section 28 and the curl 30. In some embodiments, a diameter of the transition portion 36 may change (e.g., generally decrease, generally increase, or having multiple varied diameters) in an upward direction from the thread section 28 to the curl 30. For example, in some embodiments, the transition portion 36 has a diameter that generally decreases from a first diameter proximate to the thread section 28 to a second diameter proximate to the curl 30 with the first diameter being greater than the second diameter. In other embodiments, the transition portion 36 includes a substantially constant diameter. In general, the transition portion 36 may be considered an upper non-threaded portion of the neck 26. It is noted, however, that the curl 30 may abut directly against the thread section 30 such that there is no transition portion 36, without departing from the scope of the present disclosure.

The thread section 28 may include one or more threads 33. The threads 33 may have a geometry and dimensions defined by the GCMI. In one example, as illustrated in FIG. 5A, an external diameter 38 of the thread section 28 may be between approximately 0.98 inches (25 mm) and approximately 1.18 inches (30 mm), or approximately 1.07 inches (27.15 mm). The threads 33 may have any desired pitch 44. In some embodiments, the thread pitch 44 may be between approximately 0.12 inches (3 mm) and 0.20 inches (5 mm), or approximately 0.17 inches (4.2 mm).

An internal diameter 40 of the curl 30 (or opening diameter 40) formed by the curl interior surface 32 may be between approximately 0.71 inches (18 mm) and approximately 0.87 inches (22 mm), or approximately 0.80 inches (20.05 mm). In some embodiments, an external diameter 42 of the curl 30 is between approximately 0.83 inches (21 mm) and approximately 1.10 inches (28 mm), or approximately 0.98 inches (24.90 mm). It is noted the curl 30 increases the contact surface of the metallic container 24 with a gasket (as described in detail further herein) from the thickness or gauge 39 of the metal (or the edge thickness) (e.g., which may form the edge or lip 10, as illustrated in FIGS. 1-3 and 10) to at least twice the thickness or gauge 39 of the metal.

Figure 6:
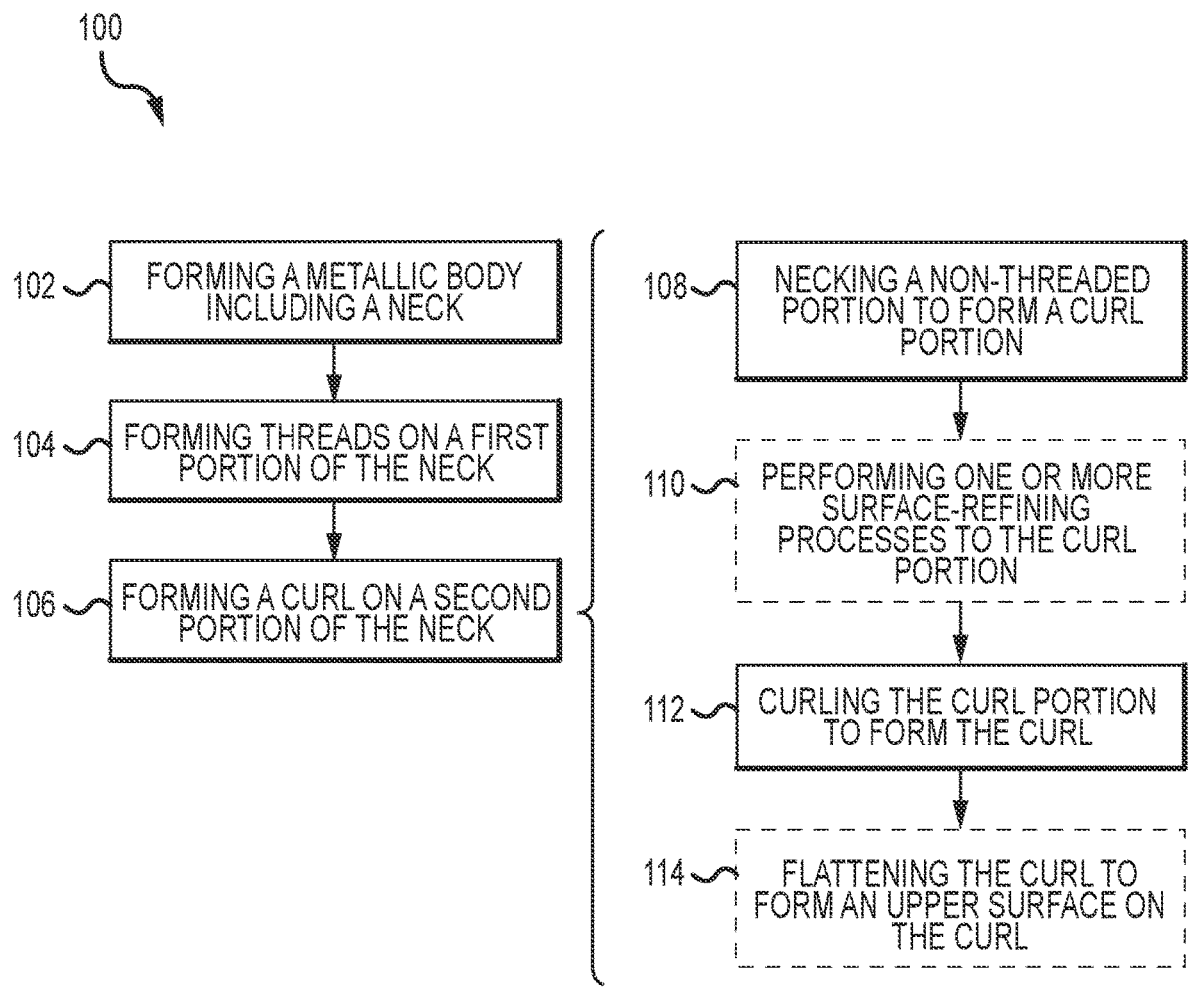
FIG. 6 is a flow diagram of a method or process for fabricating the metallic container with the threaded and curled neck of FIG. 4, in accordance with one or more embodiments of the present disclosure.

FIG. 6 depicts a method or process 100 for forming a metallic container as described in one or more embodiments of the present disclosure. The method or process 100 may include, but is not limited to, one or more of the following steps or embodiments. It is noted any components of any system-level or apparatus-level embodiment of the present disclosure may be configured to perform one or more of the following steps or embodiments and/or be acted on by one or more of the following steps or embodiments, and vice versa. FIGS. 7A-7D illustrate the neck 26 of the metallic container 24 as a series of operations are performed during fabrication of the curl 30 of the metallic container 24, in accordance with one or more embodiments of the present disclosure. It is noted the curl 30 and the metallic container 24 may be formed by any tools, systems, or apparatus known to those of skill in the art.

In a step 102, the method may include, but is not limited to, forming a metallic body including a neck. Referring back to FIGS. 4 and 5A, the metallic container 24 includes the body 23 with the hollow interior 27, the closed bottom 25, and the neck 26. In some embodiments, the neck 26 includes a reduced diameter extending away from the closed bottom 25. In addition, the neck 26 includes the opening 34 at an end of the neck 26.

The metallic container 24 with the neck 26 may be formed via one or more fabrication processes as described throughout the present disclosure. Optionally, the metallic container is formed by a DWI process. In one non-limiting example, forming the metallic container 24 may include, but is not limited to, positioning a metallic slug in a die. For instance, the metallic slug may be formed from an aluminum or an aluminum alloy. In another non-limiting example, forming the metallic container 24 may include, but is not limited to, impacting the metallic slug with a punch to form an extruded tube. In another non-limiting example, forming the metallic container 24 may include, but is not limited to, shaping the extruded tube to form the metallic container 24 with a preferred shape. In another non-limiting example, forming the metallic container 24 may include, but is not limited to, performing one or more necking processes on the metallic container 24 to reduce a diameter of a portion of the metallic body 23 and form the neck 26.

Figure 7A:
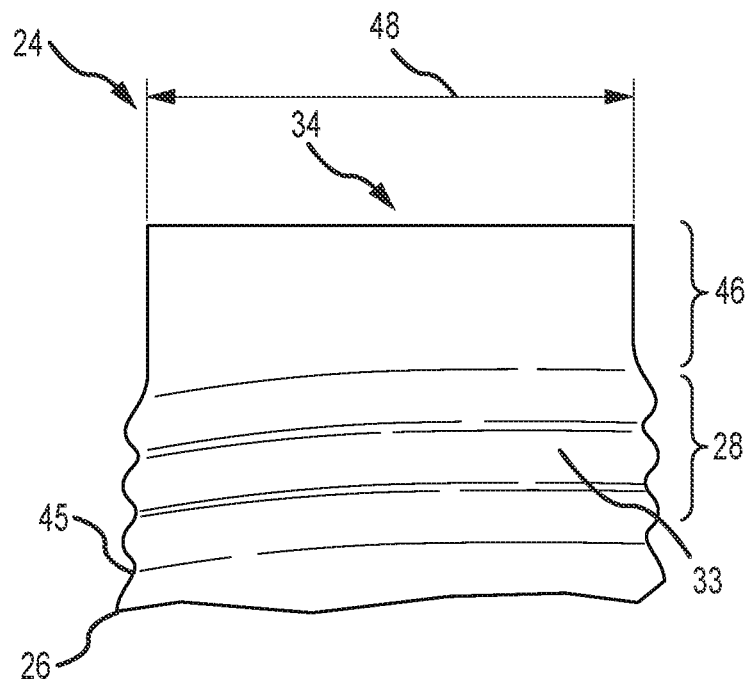
FIGS. 7A-7D illustrate a series of operations performed during formation of the metallic container with the threaded and curled neck of FIG. 4, in accordance with one or more embodiments of the present disclosure.

In a step 104, the method may include, but is not limiting to, forming threads on a first portion of the neck. FIG. 7A illustrates the metallic container 24 after a threading process is applied to the neck 26. The threading process creates the thread section 28 with one or more threads 33 on a portion of the neck. An upper non-threaded portion 46 of the neck 26 is positioned between an upper end of the thread section 28 and an opening 34 of the metallic container 24. The threads 33 may be formed by any method known to one of skill in the art.

It is noted the thread or threads 33 may be of any diameter and geometry. In some embodiments, the geometry of the threads 33 are as defined by GCMI. In addition, it is noted the neck 26 may include a retention bead or shoulder 45 below the thread section 28. For example, the retention bead or shoulder 45 may be separately fabricated from the threads 33 of the thread section 28. In addition, the retention bead or shoulder 45 may be fabricated as a portion of the thread section 28.

Figure 7B:
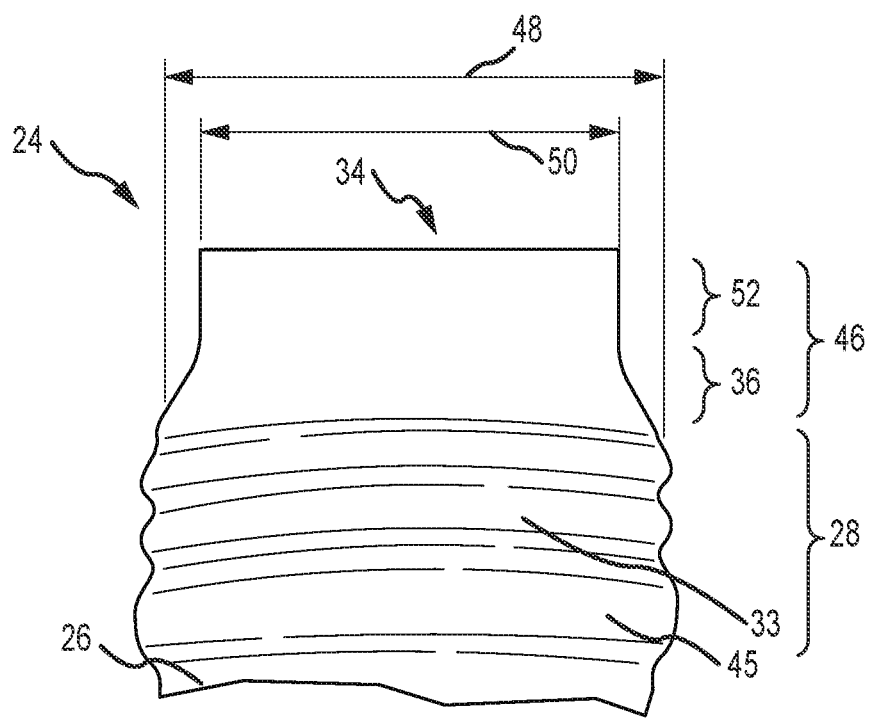
Figure 7C:
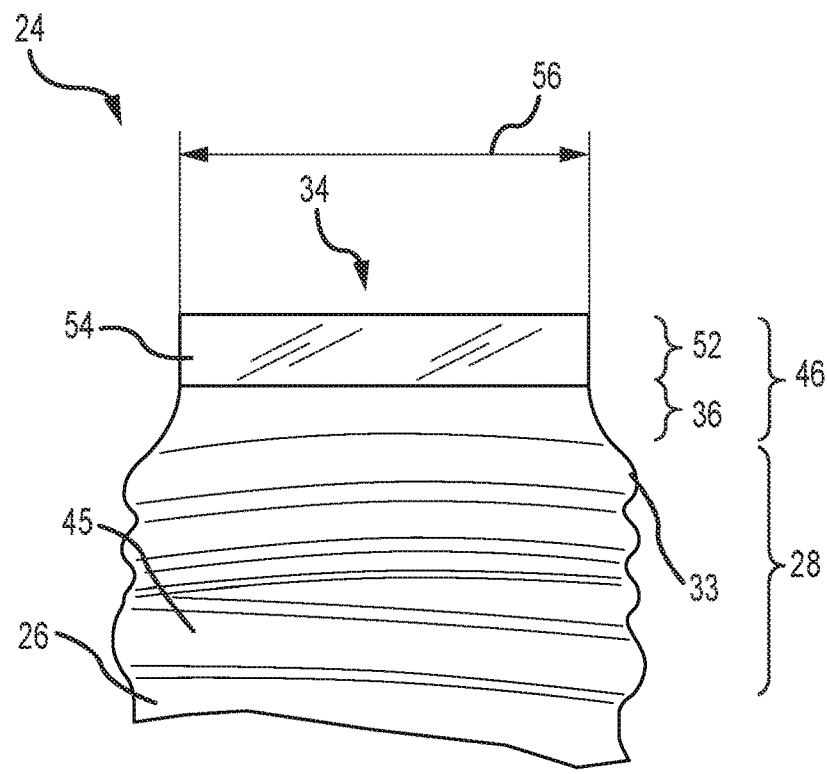

In a step 106, the method may include, but is not limited to, forming a curl on a second portion of the neck. In some embodiments, the second portion of the neck 26 is the upper non-threaded portion 46. It is noted that the curl 30 may be formed in one process or in a set of multiple simultaneous or sequential processes. One non-limiting example of a set of processes 108, 110, 112, 114 that corresponded to FIGS. 7B-7D is provided herein.

In a step 108, the method 100 may include, but is not limited to, necking a non-threaded portion to form a curl portion. FIG. 7B illustrates the metallic container 24 after one or more additional necking processes are applied to the neck 26. In one non-limiting example, the necking processes to form the curl portion are in addition to the necking processes applied to the metallic container 24 to initially form the neck 26 and occur after the formation of the threads 33 on the neck. The additional necking processes reduce an exterior surface diameter of the non-threaded portion 46 above the thread section 28. The reduction of the diameter of the non-threaded portion 46 forms a curl portion 52 adjacent to the opening 34.

In addition, the reduction of the diameter of the non-threaded portion 46 may form the transition portion 36 positioned between the curl portion 52 and the thread section 28 with threads 33, or at least further define an already-formed transition portion 36. It is noted, however, that the transition portion 36 may be fully formed prior to the additional necking processes, without departing from the scope of the present disclosure.

Figure 7D:
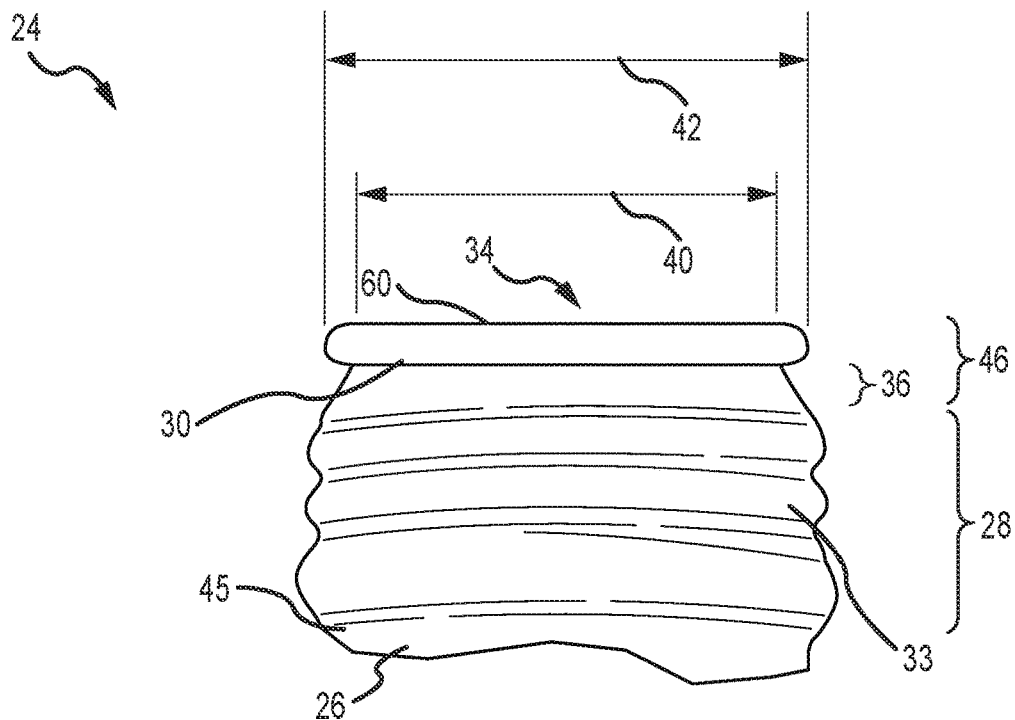

In some embodiments, the transition portion 36 may be a gradual or sloped transition between the thread section 28 and the curl portion 52 (or the curl 30, as further described herein with respect to FIG. 7D). By way of another example, the transition portion 36 may be an immediate or substantially immediate transition between the thread section 28 and the curl portion 52 (or the curl 30, as further described herein with respect to FIG. 7D). The transition portion 36 may be described as having a shape that is generally conical, or frustoconical.

In some embodiments, the non-threaded portion 46 has a first diameter 48 proximate to the thread section 28 and a second diameter 50 proximate to the curl portion 52. For example, the second diameter 50 may be less than the first diameter 48. It is noted the first diameter 48 may be the same as or different from a diameter of the neck 26. In addition, it is noted the first diameter 48 of the non-threaded portion 46 and/or the diameter of the neck 26 may be the same as or different from a diameter of an internal thread diameter (e.g., a surface in a valley between threads) in the thread section 28. Further, it is noted the external diameter 38 of the thread section 28 may be the same as or different from the diameter of the neck 26. In one non-limiting example, the transition portion 36 may be defined as between the first diameter 48 and the second diameter 50.

As generally illustrated in FIG. 7B, the curl portion 52 has a generally toroidal or cylindrical cross-section (e.g., as viewed from a top plan view) at this stage of the fabrication of the curl 30.

In a step 110, the method 100 may include, but is not limited to, performing one or more surface-refining processes to the curl portion. FIG. 7C illustrates the metallic container 24 after one or more surface-refining processes including, but not limited to, a polishing, a grinding, a sanding, a milling, a cutting, a coating application process, (e.g., a food-grade coating such as a varnish, lacquer, epoxy, or the like) or similar modification processes are applied to the curl portion 52. The surface-refining processes may be performed on one or more of an interior surface of the curl portion 52 and an exterior surface of the curl portion 52.

In one or more embodiments, at least one of the surface-refining processes is applied to the interior surface of the curl portion 52 before the curl 30 is formed. In this manner, when the curl 30 is formed in operation 112 by curling the curl portion 52 outwardly, the interior surface treated by the surface-refining process become an exterior surface of the curl 30.

Additionally, or alternatively, at least one of the surface-refining processes may optionally be applied to an exterior surface of the curl portion.

The processes form a modified curl portion 54. For example, the modified curl portion 54 may have a third diameter 56 on an exterior surface of the non-threaded portion 46. The third diameter 56 may be less than the second diameter 50 or greater than the second diameter 50, depending on the surface-refining process.

With respect to a coating being applied, it is noted that the coating may promote increased adhesion between the curl and an insert positioned between the curl and a closure, when the insert and the curl 30 engage. For example, where the insert is a tamper indicator or freshness sealer coupled directly to the curl 30, the coating may promote adhesion of the insert to the curl 30. It is noted that the coating may be applied to the interior or the exterior of the curl portion 52 to form the modified curl portion 54. In addition, it is noted that the coating may be applied before or after steps 108, 112, and/or 114, as described herein. Finally, it is noted the surface-refining processes may be optional depending on manufacturer, customer, and/or end user preference. Accordingly, in some embodiments, the curl 30 of the present disclosure is formed without creating the modified curl portion 54.

In a step 112, the method 100 may include, but is not limited to, curling the curl portion to form the curl. For example, the curling process may curl the curl portion 52 (or modified curl portion 54) outwardly, inwardly, or in multiple direction (e.g., layering). FIG. 7D illustrates the metallic container 24 after one or more curling processes are applied to the curl portion 52. In one non-limiting example, curling processes roll the curl portion 52 outward from a longitudinal central axis 58 defined through the neck (see e.g., FIG. 5A for the axis 58) to form the curl 30, where the curl 30 is a rounded portion that removes or replaces an edge (e.g., edge or lip 10) on the neck 26. It is noted the curl 30 increases the contact surface of the metallic container 24 with a surface of a closure and/or a gasket within the closure (as described in detail further herein) from the thickness or gauge of the metal (or the edge thickness) to at least twice the thickness or gauge of the metal. It is noted the curl 30 may be formed through one or multiple folding or bending processes applied to the curl portion 52.

It is noted the curl 30 may be applied to a metallic container 24 with any thread diameter and/or thread section 28 as defined by GCMI. Rolling the curl portion 52 into the curl 30 forms the external curl diameter 42 and may form the internal curl diameter 40 where it changes from the internal diameter formed by the additional necking processes described in conjunction with FIG. 7B. However, it is noted the internal curl diameter 40 may be formed during the additional necking processes used to form the curl portion 52 and maintained during the curling processes used to form the curl 30.

In a step 114, the method 100 may include, but is not limited to, flatting the curl to form an upper surface on the curl. For example, as illustrated in FIG. 7D (and FIG. 5B), the curl 30 may be partially flattened to generate an upper surface 60 that is generally planar. For example, the upper surface 60 may be formed by pressing against the rounded curl 30. By way of another example, the upper surface 60 may be formed by removing material from the curl 30 (e.g., by a surface-refining process such as polishing, grinding, sanding, milling, cutting, or the like). It is noted the upper surface 60 may range between 0.039 inches (1.0 mm) and 0.059 inches (1.5 mm) for the width 61. In addition, it is noted the flattening processes may be optional depending on manufacturer, customer, and/or end user preference. Further, it is noted the flattening processes may be optional depending on the type of closure and/or gasket, tamper indicator, or freshness sealer engaged with the curl 30. Accordingly, in some embodiments, the curl 30 of the present disclosure is formed without the flattened upper surface 60.

Figure 8:
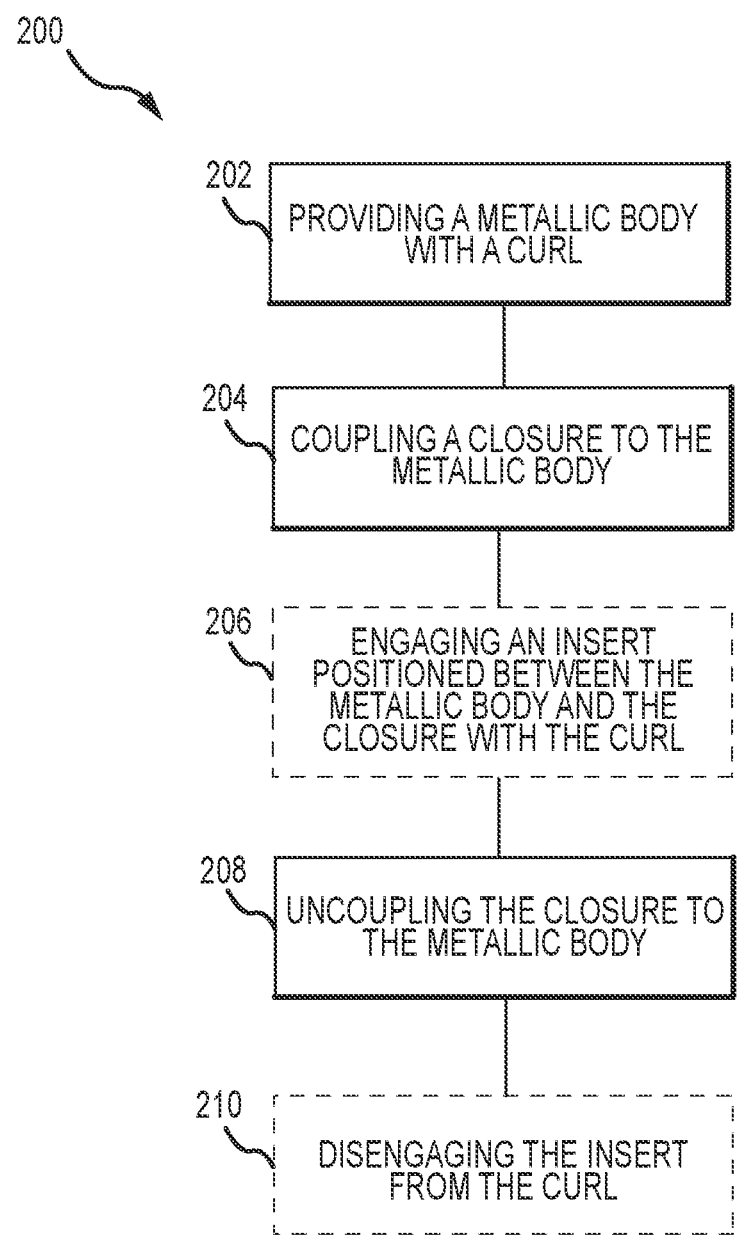
FIG. 8 is a flow diagram of a method or process for attaching a closure and gasket to the metallic container with the threaded and curled neck of FIG. 4, in accordance with one or more embodiments of the present disclosure.

FIG. 8 depicts a method or process 200 for attaching a closure and gasket to a container as described in one or more embodiments of the present disclosure. The method or process 200 may include, but is not limited to, one or more of the following steps or embodiments. It is noted any components of any system-level or apparatus-level embodiment of the present disclosure may be configured to perform one or more of the following steps or embodiments and/or be acted on by one or more of the following steps or embodiments, and vice versa.

In a step 202, the method 200 may include, but is not limited to, providing a metallic container with a curl. In some embodiments, the operations described in conjunction with—FIG. 6 and as illustrated in FIGS. 7A-7D along with any preceding fabrication operations as described throughout the disclosure, may form the metallic container 24 with the curl 30.

It is noted that providing the metallic container (or in some embodiments, forming the metallic container 24) with the curl 30 may be a first portion of a process for fabricating a sealed container configured to hold fluid or solid products. Additional operations for fabricating a sealed container configured to hold a gas, fluid, and/or solid product may include a single process or in a set of multiple simultaneous or sequential processes. One non-limiting example of a set of processes 202, 204, 206, 208 is provided herein.

In a step 204, the method 200 may include, but is not limited to, coupling a closure to the metallic container. The closure may include, but is not limited to, the closure 64 or the closure 80, as described in detail herein.

In a step 206, the method 200 may include, but is not limited to, engaging an insert positioned between the metallic body and the closure with the curl. For example, the insert may include, but is not limited to, a gasket 74 and/or a tamper indicator or freshness sealer 86 (e.g., a partial or full layer fabricated from paper, plastic, metal, or combinations thereof), as described in detail herein. In some embodiments, the insert is engaged when the closure 64 or the closure 80 is coupled to the metallic container 24 (e.g., via the threads 33 and respective closure threads) and the closure 64 or the closure 80 is nearly-fully or fully seated against the curl 30. For example, engaging the insert (the gasket 74 or the indicator or sealer 86) with the curl 30 when the closure 64 or the closure 80, respectively, is coupled to the metallic container 24 generates a seal between the curl 30 (or metallic container 24) and the closure 64 or the closure 80 to hold the gas, fluid, or solid product within the hollow interior 27 of the metallic container 24. In other embodiments, the insert is engaged with the curl 30 prior to the closure 64 or the closure 80 being coupled to the metallic container 24. Where a coating is applied to the curl 30, the coating may promote increased adhesion between the insert and the curl when the insert and the curl engage.

It is noted, however, that step 206 is optional where an insert such as a gasket 74 or the tamper indicator or freshness sealer 86 is not installed within the closure 64 or the closure 80, respectively. In addition, it is noted this step is optional where an insert such as a gasket 74 or the tamper indicator or freshness sealer 86 is not positioned between the closure 64 or the closure 80, respectively, and the curl 30.

In a step 208, the method 200 may include, but is not limited to, uncoupling the closure from the metallic container. In some embodiments, the closure 64 or the closure 80 may be uncoupled to access the gas, fluid, or solid product for use. In other embodiments, the closure 64 or the closure 80 may be uncoupled to supplement and/or refill the gas, fluid, or solid product previously held in the metallic container.

In a step 210, the method 200 may include, but is not limited to, disengaging the insert from the curl. In some embodiments, the insert 74 or 86 is disengaged when the closure 64 or the closure 80, respectively, is uncoupled from the metallic container 24, breaking the seal formed between the curl 30 (or metallic container 24) and the closure 64 or the closure 80. In other embodiments, the insert is disengaged with the curl 30 after the closure 64 or the closure 80 is uncoupled to the metallic container 24.

It is noted step 210 is optional where an insert such as the gasket 74 or the tamper indicator or freshness sealer 86 is not installed within the closure 64 or the closure 80, respectively. In addition, is noted this step is optional where an insert such as a gasket 74 or the tamper indicator or freshness sealer 86 is not positioned between the closure 64 or the closure 80 and the curl 30, respectively.

In this regard, the curl 30 of the present disclosure is configured to reduce damage to the closure 64 or the closure 80 during at least one of the closure being coupled to or uncoupled from the neck 26 and/or any insert inserted between the closure and the metallic body. For example, the curl 30 provides an advantage where a potentially sharp or otherwise damaging edge or lip of the metallic container 24 (e.g., an edge or lip 10, as illustrated in FIGS. 1-3 and 10) is rolled into the curl 30 and removed from contact with the closure 64 or the closure 80 and/or the insert 74 or 86 inserted between the closure 64 or the closure 80, respectively, and the metallic container 24.

FIGS. 9-10 and 11A-11B illustrate exemplary embodiments of the metallic container 24 with closures 64/80, in accordance with one or more embodiments of the present disclosure. It is noted the method 100 and/or 200 may form and/or act on any of the metallic containers 24, closures, and/or inserts between the closure and the metallic container 24 as illustrated in FIGS. 9-10 and 11A-11B, without departing from the scope of the present disclosure.

The closures 64/80 include a closure thread 70/82 which is formed before the closure 64/80 is coupled to the metallic container 24. This provides many benefits. For example, in a metal roll-on pilfer proof (ROPP) closure known to those of skill in the art, the closure threads are formed after the ROPP closure is positioned on the metallic container. The closure threads of the ROPP closure are formed with a thread roller that pushes the ROPP closure again the container threads. Forming the closure threads of a ROPP closure requires the application of a significant force directly inwardly against the container threads. The force from the thread roller can damage the metallic container 24. Further, the container neck and its container threads must be formed to have sufficient strength to resist damage from the thread roller. This can be accomplished by making the thread portion thicker, or by using a stronger material to form the metallic container.

The metallic container 24 of one or more embodiments of the present disclosure may be formed of a thinner material than prior art metallic containers sealed with ROPP closures due to the use of the closure 64/80 with a pre-formed closure thread 70/82. More specifically, one or more of the neck 26 and the thread section 28 of the metallic container 24 may be formed of a thinner material, or a metal material that is less rigid or strong, than a prior art metallic container configured to be sealed with a ROPP closure. In this manner, the metallic container 24 of embodiments of the present invention may be force of less metallic material, or different metallic material, than a prior art metallic container of the same size and volume.

Another benefit of the closures 64/80 of the present disclosure is that it does not include a detachable pilfer band such as those used with a ROPP closure. As will be appreciated by one of skill in the art, known ROPP closures include a pilfer band that is releasable attached to a threaded skirt or body of the ROPP closure. After the ROPP closure is sealed to a metallic container, rotating the ROPP closure at least partially in an opening direction causes the pilfer band to separate or be visibly altered. When the pilfer band is severed, the ROPP closure cannot be used to reseal the metallic container. In contrast, the closures 64/80 of embodiments of the present disclosure may be coupled to and removed from a metallic container multiple times. Accordingly, the closures 64/80 of the present disclosure may be referred to as reusable closures.

Figure 9:
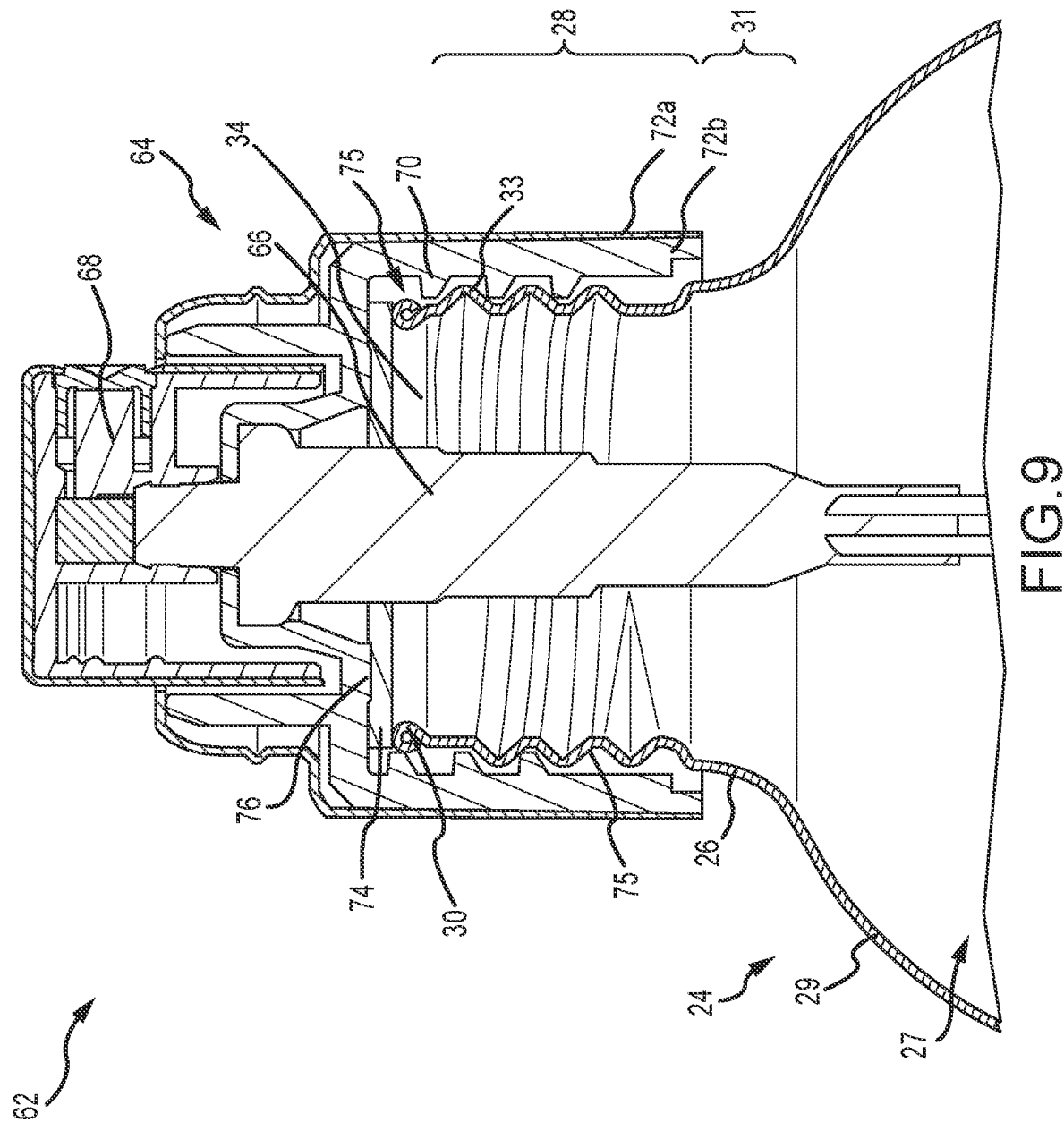
FIG. 9 is a cross-sectional front elevation view of a pump assembly with a gasket coupled to the metallic container with the threaded and curled neck of FIG. 4, in accordance with one or more embodiments of the present disclosure.

FIGS. 9 and 10 in general illustrate a sealed container 62 configured to hold a gas or fluid, in accordance with one or more embodiments of the present disclosure. The sealed container 62 includes the closure 64 (or enclosure 64) that seals the opening 34 of the metallic container 24. In one example embodiment as illustrated in FIGS. 9 and 10, the apparatus 62 may be a cosmetic bottle, and the closure 64 may be a cosmetic dispenser or pump assembly which includes a gas or fluid channel 66 in communication with a dispenser 68 (e.g., a pump nozzle, a spray nozzle, or the like). In another example embodiment, the closure 64 may include a manually operated pump or an aerosol closure. The gas or fluid channel 66 is configured to fit within an opening of the metallic container 24, and may include components such as, but not limited to, a piston, piston seat, spring, tubing, and other components.

The closure 64 includes a closure thread 70. The closure 64 may include an exterior casing 72a and, in some embodiments, an interior casing 72b. For example, the interior casing 72b may include the closure thread 70. It is noted the exterior casing 72a may be formed to additionally or alternatively include the closure thread 70. For example, the exterior casing 72a may be formed with the closure thread 70, where the interior casing 72b is contoured to conform to the exterior casing 72a. By way of another example, the exterior casing 72a may be formed with the closure thread 70, where the closure 64 does not include the interior casing 72b, resulting in a single-layer casing 72.

In one or more embodiments, the exterior casing 72a is optionally formed of a first material. The first material may be a metal or a plastic. In at least one embodiment, the first material is the metal. In one or more embodiments, the interior casing 72b is formed of a second material that is different than the first material. In some embodiments, the second material is a polymer such as an elastomer (e.g., rubber), a plastic, or the like.

Select components of the gas or fluid channel 66 are configured to fit within the casing 72a and/or 72b, and other select components of the gas or fluid channel 66 are configured to extend beyond the casing 72a and/or 72b (e.g., into the opening of the metallic container, through a top surface of the casing 72a and/or 72b, or the like).

The closure 64 includes a gasket 74 (e.g., an insert 74, for purposes of the present disclosure) within a cavity 75, where the cavity 75 is defined within the casing 72a and/or 72b. The gasket 74 may be held against and/or otherwise coupled to an interior closure surface 76 of the cavity 75.

As illustrated in FIG. 9, the sealed container 62 includes the closure 64 and the metallic container 24. The closure thread 70 is configured to engage the thread of the thread section 28 of the metallic container 24. The curl 30 of the metallic container 24 engages the gasket 74 when the closure 64 is coupled to the metallic container 24. Pressure applied to the gasket 74 by the curl 30 when the closure 64 engages the metallic container 24 results in a seal, preventing leakage from the metallic container 24.

The curl 30 being rounded and/or having a flattened upper surface 60 reduces (or prevents) damage to the gasket 74 when the closure 64 is coupled to or uncoupled from the metallic container 24, causing the curl 30 to engage and disengage the gasket 74. It is noted the upper surface 60 of the curl 30 that is flattened or made generally planar in accordance with one or more embodiments of the present disclosure may provide additional surface area for contact with the gasket 74. As compared to a non-flattened curl 30, the additional surface area may further reduce damage to the finish of the closure 64 and/or to the gasket 74 occurring through repeated coupling and uncoupling of the closure 64 from the metallic container 24, causing the curl 30 to engage and disengage the gasket 74, by distributing forces applied on the gasket 74 by the curl 30. Further, it is noted the additional surface area may also increase the sealing area between the metallic bottle 24 and the closure 64.

In contrast, as illustrated in FIG. 10, the gasket 74 may be damaged when the closure 64 is coupled to a metallic container 2 without a curl (e.g., as further illustrated in FIG. 1-3). For example, the lip or edge 10 may cut into the gasket 74 when the closure 64 is coupled to and/or uncoupled from the metallic container 2, causing the lip or edge 10 to engage and disengage the gasket 74. Specifically, as the closure 64 is threaded onto the metallic container 2, the lip or edge 10 may press against a lower surface of the gasket 74, and may further become embedded within the gasket 74 between the lower surface and an upper surface of the gasket 74.

As seen in a comparison between FIGS. 9 and 10, the curl 30 of the metallic bottle 24 provides a solution to the damaging of closures and subsequent leaking of contained gas or fluid products. For example, the sealed container 62 is desirable as a reusable container in the refillables market, where the sealed container 62 may be returned to a retailer to be refilled from a bulk container. Due to the curl 30, damage to the finish of the closure 64 and/or the gasket 74 may be reduced or eliminated during the engaging and disengaging of the gasket 74 and the curl 30 caused by the repeated coupling or uncoupling of the closure 64 to the metallic container 24. In this regard, the curl 30 adds value and an increased life cycle to the closure 64 (and the sealed container 62 in general).

Figure 11A:
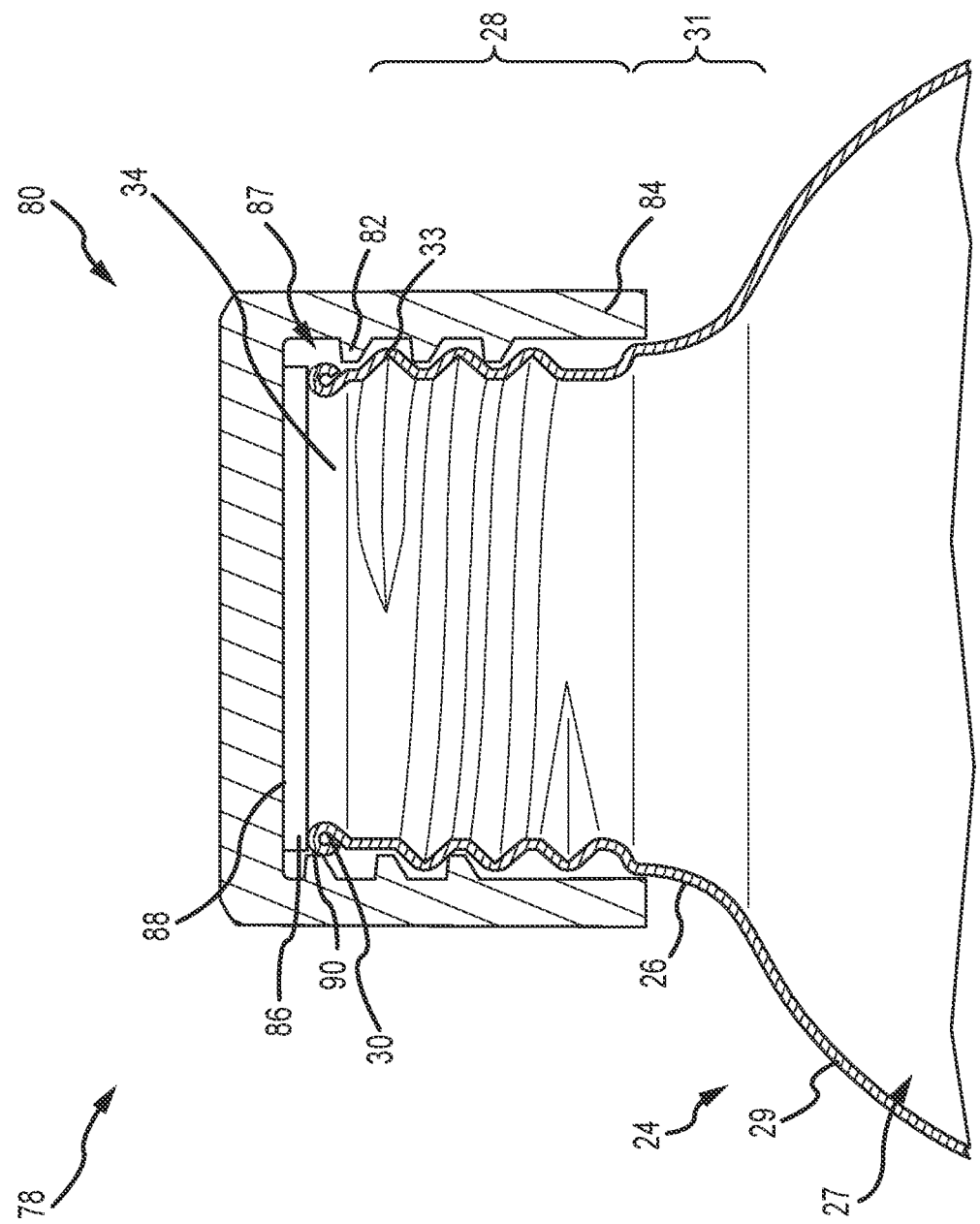
FIG. 11A is a cross-sectional front elevation view of a closure and a tamper indicator or freshness sealer coupled to the metallic container with the threaded and curled neck of FIG. 4, in accordance with one or more embodiments of the present disclosure.
Figure 11B:
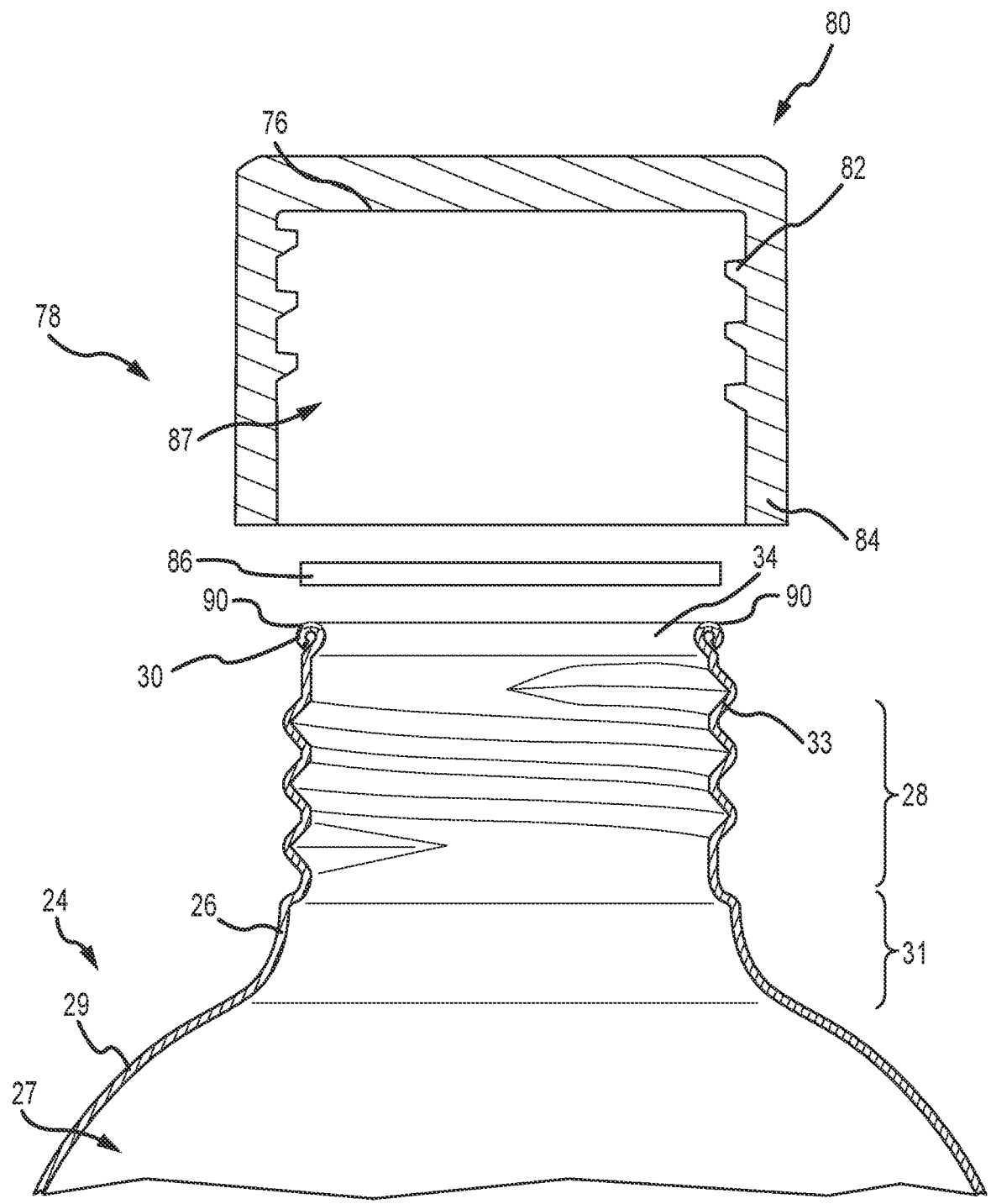
FIG. 11B is an exploded view of the metallic container with the threaded and curled neck of FIG. 11A, in accordance with one or more embodiments of the present disclosure.

FIGS. 11A-11B in general illustrate a sealed container 78 configured to hold a fluid or a solid, in accordance with one or more embodiments of the present disclosure. It is noted that embodiments directed to the sealed container 78 may be directed to the sealed container 62, and vice versa, unless otherwise noted. The sealed container 78 includes the closure 80 (or enclosure 80) that seals the opening 34 of the metallic container 24.

The closure 80 includes a closure thread 82. The closure 80 may include a casing 84. For example, the casing 84 may be a single-layer casing. In one or more embodiments, the casing 84 is formed of a first material including, but not limited to, a metal, a polymer such as an elastomer, a plastic, or the like. By way of another example, the casing 84 may include an exterior portion and an interior portion, similar to the casing portions 72a, 72b in FIGS. 9 and 10. In one or more embodiments, the exterior portion of the casing 84 is optionally formed of a first material. The first material may be a metal or a plastic. In at least one embodiment, the first material is the metal. In one or more embodiments, the interior portion is formed of a second material that is different than the first material. In some embodiments, the second material is a polymer such as an elastomer (e.g., rubber), a plastic, or the like.

The casing 84 includes the closure thread 82. Although not illustrated, where the casing 84 includes the exterior and interior portions similar to the casing portions 72a, 72b, the interior portion may include the closure thread 82. It is noted the exterior portion may be formed to additionally or alternatively include the closure thread 82. For example, the exterior portion may be formed with the closure thread 82, where the interior portion is contoured to conform to the exterior portion.

The closure 80 includes a tamper indicator or freshness sealer 86 (e.g., an insert 86, for purposes of the present disclosure) within a cavity 87, where the cavity 87 is defined within the casing 84. The tamper indicator or freshness sealer 86 may be held against and/or otherwise coupled to an interior closure surface 88 of the cavity 87. For example, the tamper indicator or freshness sealer 86 may be inserted in the cavity 87 defined within the closure 80, such that coupling the closure 80 to the metallic container 24 causes the tamper indicator or freshness sealer 86 to engage the curl 30.

However, without departing from the scope of the present disclosure, it is noted that the tamper indicator or freshness sealer 86 may engage the curl 30 along an upper contact edge (e.g., where the curl is rounded) or the upper contact surface 60 (e.g., where the curl is at least partially flattened) prior to installation of the closure 80. In addition, without departing from the scope of the present disclosure, it is noted that the tamper indicator or freshness sealer 86 may at least partially wrap around the curl 30 prior to installation of the closure 80, and may further contact at least a portion of the threads 33 on the neck 26. In this regard, the tamper indicator or freshness sealer 86 should not be understood as being limited to a component installed within the closure 80, but instead should also be a component installable between the closure 80 and the metallic container 24 to generate the sealed container 78.

In some embodiments, the metallic container 24 includes a coating 90 applied to (and around) the curl 30 (e.g., within the opening 34, on the curl 30 including the upper surface 60, and the like). It is noted the tamper indicator or freshness sealer 86 may benefit from increased adhesion promoted by the coating 90 applied to the curl 30, making the curl 30 a more adherable surface than the metal (e.g., aluminum) alone.

As illustrated in FIG. 11A, the sealed container 78 includes the closure 80 and the metallic container 24. The closure thread 82 is configured to engage the thread of the thread section 28 of the metallic container 24. The curl 30 of the metallic container 24 engages the tamper indicator or freshness sealer 86 when the closure 80 is coupled to the metallic container 24. Pressure applied to the tamper indicator or freshness sealer 86 by the curl 30 when the closure 80 engages the metallic container 24 results in a seal, preventing leakage from the metallic container 24.

The curl 30 being rounded and/or having a flattened upper surface 60 reduces (or eliminates) damage to the tamper indicator or freshness sealer 86 when the closure 80 is coupled to or uncoupled from the metallic container 24, causing the curl 30 to engage and disengage the tamper indicator or freshness sealer 86. It is noted the upper surface 60 of the curl 30 that is flattened or made generally planar in accordance with one or more embodiments of the present disclosure may provide additional surface area for contact with the tamper indicator or freshness sealer 86. As compared to a non-flattened curl 30, the additional surface area may further reduce damage to the finish of the closure 80 and/or to the tamper indicator or freshness sealer 86 occurring through repeated coupling and uncoupling of the closure 64 from the metallic container 24, causing the curl 30 to engage and disengage the tamper indicator or freshness sealer 86, by distributing forces applied on the tamper indicator or freshness sealer 86 by the curl 30. Further, it is noted the additional surface area may also increase the sealing area between the metallic bottle 24 and the closure 80.

Thus, the curl 30 of the metallic bottle 24 provides a solution to the damaging of closures and subsequent leaking of contained gas, fluid, or solid products. For example, the sealed container 78 is desirable as a reusable container in the refillables market, where the sealed container 78 may be returned to a retailer to be refilled from a bulk container. Due to the curl 30, damage to the finish of the closure 80 or the tamper indicator or freshness sealer 86 may be reduced or eliminated during the engaging and disengaging of the tamper indicator or freshness sealer 86 and the curl 30 caused by the repeated coupling or uncoupling of the closure 80 to the metallic container 24. In this regard, the curl 30 adds value and an increased life cycle to the closure 80 (and the sealed container 78 in general).

It is noted herein any methods or processes described throughout the disclosure may include more or fewer operations or embodiments than those described. In addition, it is noted herein the operations or embodiments of any methods or processes may be performed at any time (e.g., sequentially, concurrently, or simultaneously). Further, it is noted herein the operations or embodiments of any methods or processes may be performed in any order, including in an order as presented in the disclosure and/or an order other than that presented in the disclosure.

Advantages of the present disclosure are directed to a metallic container that includes a neck with a formed curl. The formed curl may be configured to engage with a closure and/or a gasket, a tamper indicator, or a freshness sealer in a non-interfering manner, preventing damage to the closure and/or the gasket, the tamper indicator, or the freshness sealer that may be caused by a neck that does not include a curl. In addition, the formed curl may prevent injury to a user (e.g., while drinking or otherwise accessing contents within the metallic container) that may be caused by interaction with a neck does not include a curl. Advantages of the present disclosure are also directed to forming the metallic container, including forming the curl on the metallic container, as well as coupling/uncoupling a closure to the metallic container to cause a gasket, a tamper indicator, or a freshness sealer to engage with/disengage from the curl.

In this regard, the present disclosure provides a solution to a long-felt but unsolved need regarding improved metallic containers that are usable and reusable due to decreased wear on a closure and/or a gasket, tamper indicator, or freshness sealer that is in contact with the metallic container. In particular, the curl of the metallic container is in contact with the closure and/or the gasket, tamper indicator, or freshness sealer, reducing the degradation of the closure and/or the gasket, tamper indicator, or freshness sealer when the closure is coupled to and/or uncoupled from the metallic container. In turn, the metallic container may be reusable, including for drinking and/or for refilling contents such as a gas, fluid, or solid product from a bulk supply. The present disclosure also provides improvements to the forming of portions of a neck of the metallic container and/or proximate to an opening in the metallic container.

While various embodiments of the system and method have been described in detail, it is apparent that modifications and alterations of those embodiments will occur to those skilled in the art. It is to be expressly understood that such modifications and alterations are within the scope and spirit of the present disclosure. Further, it is to be understood that the phraseology and terminology used herein is for the purposes of description and should not be regarded as limiting. The use of "including," "comprising," or "having" and variations thereof herein are meant to encompass the items listed thereafter and equivalents thereof, as well as, additional items. Further, it is to be understood that the claims are not necessarily limited to the specific features or operations described herein. Rather, the specific features and operations are disclosed as embodiments of implementing the claimed systems and methods.

What is claimed is:

1. A sealable container, comprising:
    a metallic body with a hollow interior, a closed bottom, a neck extending away from the closed bottom, a body thread formed on a portion of the neck, a curl positioned at an end of the neck and formed in a curl portion above the body thread, an opening defined by the curl, and a transition portion positioned between the body thread and the curl portion;
    a removable closure comprising a gas or fluid channel, a casing, and a closure thread formed in the casing; and
    a gasket in contact with an upper portion of the curl, wherein the curl has an upper surface that is flattened to define a planar section,
    wherein the body thread of the neck engages the closure thread when the removable closure is coupled to the neck such that the gas or fluid channel passes through the removable closure and the gasket to extend into the metallic body when the removable closure is removably coupled to the metallic body via engagement of the closure thread and the body thread, wherein contact of the gasket with the curl generates a seal between the gasket and the curl and seals the opening of the metallic body, wherein the curl increases a contact surface between the neck and the gasket by an amount at least twice a thickness or gauge of a metal forming the curl portion, wherein the planar section of the curl has a second thickness less than the thickness or gauge of the metal forming the curl portion, wherein the flattened upper surface of the curl further increases the contact surface between the curl and the gasket as compared to a neck having a non-curled end, and wherein the curl reduces or eliminates damage to the gasket during at least one of the removable closure being coupled to or uncoupled from the neck as compared to a neck having a non-curled end.

2. The sealable container of claim 1, wherein the contact of the gasket with the curl seals a gas or a fluid product within the hollow interior of the metallic body, wherein the gasket is installed in a cavity defined within the casing prior to the removable closure coupling to the neck, and wherein the gas or fluid channel is in communication with a dispenser.

3. The sealable container of claim 2, wherein the removable closure includes a manually operated pump or an aerosol closure, wherein the closure thread is formed before the removable closure is coupled to the metallic body, and wherein the removable closure is reusable.

4. The sealable container of claim 1, wherein the neck is modified by one or more surface-refining processes to remove material from the curl portion prior to the curl being formed on the neck.

5. A sealable metallic container adapted for use with a reusable closure, comprising:
    a body with a hollow interior, a closed bottom, and a neck extending away from the closed bottom, wherein the neck comprises a thread, a curl formed from a curl portion of the neck above the thread, and a transition portion between the thread and the curl portion, wherein a cross-section of the curl has a substantially constant curl radius, wherein the curl defines an opening of the body, wherein the thread of the neck is configured to engage a corresponding closure thread of the reusable closure when the reusable closure is coupled to the neck, wherein contact between the curl and an insert generates a seal between the insert and the curl, wherein the curl increases a contact surface between the neck and the insert by an amount at least twice a thickness or gauge of a metal forming the curl portion, and wherein the curl reduces or prevents damage to the insert during at least one of the reusable closure being coupled to or uncoupled from the neck.

6. The sealable metallic container of claim 5, wherein the curl has a first exterior diameter and the thread has a second exterior diameter that is greater than the first exterior diameter, wherein the metal of the curl has a first thickness measured in a lateral direction perpendicular to a vertical axis of the body, and wherein a portion of the body proximate to the closed bottom has a second thickness measured in the lateral direction that is less than the first thickness.

7. The sealable metallic container of claim 6, wherein an upper surface of the curl is flattened to form a planar area with a third thickness less than the first thickness measured in the lateral direction and that has a first width measured in the lateral direction, and wherein the first width is at least two times greater than the first thickness of the metal of the curl.

8. The sealable metallic container of claim 5, wherein the curl comprises an upper surface that is generally planar, wherein the planar upper surface increases contact surface area between the curl and the insert.

9. A method of forming a sealable container adapted and configured for use with a reusable closure, comprising:
    forming a metallic body with a hollow interior, a closed bottom, a neck with a reduced diameter extending away from the closed bottom, and an opening at an end of the neck;
    forming a thread on a portion of the neck, wherein a non-threaded portion of the neck is positioned between the opening and the thread, wherein the thread engages a corresponding closure thread of a reusable closure when the reusable closure is coupled to the neck;
    necking the non-threaded portion to form a curl portion adjacent to the opening and a transition portion between the curl portion and the thread; and
    curling the curl portion outwardly to form a curl, wherein the curl defines a diameter of the opening, wherein one or more surface-refining processes are performed on the curl portion prior to curling the curl portion, and wherein the one or more surface-refining processes include a polishing, a grinding, a sanding, a milling, and a cutting,
    wherein the curl is configured to engage an insert within the reusable closure and positioned proximate to the curl and generate a seal between the insert and the curl, and wherein the curl increases a contact surface between the neck and the insert by an amount at least twice a thickness or gauge of a metal forming the curl portion.

10. The method of claim 9, wherein the one or more surface-refining processes further include a coating application process.

11. The method of claim 10, wherein the coating application process applies a coating to the curl portion that promotes increased adhesion between the insert and the curl when the insert within the reusable closure and the curl engage during coupling of the reusable closure to the sealable container.

12. The method of claim 9, further comprising:
    forming a flattened upper surface on the curl to further increase the contact surface between the curl and the insert, wherein the flattened upper surface has a first width measured in a lateral direction perpendicular to a vertical axis of the metallic body, and wherein the metal of the curl has a first thickness measured in the lateral direction and a second thickness less than the first thickness at the flattened upper surface, the first width being at least two times greater than the first thickness.

13. The method of claim 9, further comprising:
    coupling the reusable closure to the metallic body, wherein the reusable closure includes a casing, a gas or fluid channel, a dispenser, and the insert in a cavity defined within the casing, wherein at least a portion of the gas or fluid channel is inserted through the casing and the insert, and wherein at least a portion of the gas or fluid channel is configured to fit within the opening defined by the curl, and wherein the insert is a gasket; and
    engaging the curl with the insert when the reusable closure is coupled to the metallic body, wherein engaging the curl with the insert generates a seal to hold a gas or a fluid product within the hollow interior of the metallic body.

14. The method of claim 13, further comprising:
    uncoupling the reusable closure from the metallic body; and
    disengaging the insert from the curl when the reusable closure is uncoupled from the metallic body, wherein disengaging the insert from the curl breaks the generated seal.

15. The method of claim 9, further comprising:
    coupling the reusable closure to the metallic body, wherein the reusable closure includes a casing and the insert in a cavity defined within the casing, wherein the insert is a tamper indicator or a freshness sealer; and
    engaging the curl with the insert when the reusable closure is coupled to the metallic body, wherein engaging the curl with the insert generates a seal to hold a fluid or a solid product within the hollow interior of the metallic body.

16. The method of claim 15, further comprising:
    uncoupling the reusable closure from the metallic body; and
    disengaging the insert from the curl when the reusable closure is uncoupled from the metallic body, wherein disengaging the insert from the curl breaks the seal to release the fluid or the solid product.

17. The method of claim 9, further comprising:
    engaging the curl with the insert prior to coupling the reusable closure to the metallic body, wherein engaging the curl with the insert generates a seal to hold a fluid or a solid product within the hollow interior of the metallic body, and wherein the insert is a tamper indicator or a freshness sealer; and
    coupling the reusable closure to the metallic body, wherein the closure thread is formed before the reusable closure is coupled to the metallic body, wherein the reusable closure includes a casing and a cavity defined within the casing, wherein the insert is positioned within the cavity when the reusable closure is coupled to the metallic body, and wherein the reusable closure is configured to be removed from the metallic body without damage to the insert.

18. The method of claim 9, wherein after necking the non-threaded portion, the curl portion has a shape that is generally toroidal, wherein the transition portion has a first diameter that is greater than a second diameter of the curl portion, and wherein an outer diameter of the curl is less than an outer diameter of the thread.

19. The method of claim 9, wherein the metal of the curl has a first thickness measured in a lateral direction perpendicular to a vertical axis of the metallic body, wherein the metal of the neck has a second thickness measured in the lateral direction, and wherein the metal of a portion of the metallic body below the neck has a third thickness measured in the lateral direction, the first thickness being greater than the second and third thicknesses.

* * * * *